United States Patent [19]
Aoki et al.

[11] Patent Number: 4,883,346
[45] Date of Patent: Nov. 28, 1989

[54] ZOOM LENS SYSTEM
[75] Inventors: Norihiko Aoki; Juro Kikuchi, both of Tokyo, Japan
[73] Assignee: Olympus Optical Co., Ltd., Tokyo, Japan
[21] Appl. No.: 227,803
[22] Filed: Aug. 3, 1988
[30] Foreign Application Priority Data
  Aug. 5, 1987 [JP] Japan ................................ 62-194421
[51] Int. Cl.⁴ ........................ G02B 15/15; G02B 9/60; G02B 9/34
[52] U.S. Cl. ...................................... 350/423; 350/413
[58] Field of Search ........................ 350/413, 423, 427
[56] References Cited
  FOREIGN PATENT DOCUMENTS
  61-148414  7/1986  Japan .
  61-259216 11/1986  Japan .................................... 350/413
  61-295524 12/1986  Japan .
  62-138817  6/1987  Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system comprising a first lens group having positive refractive power and a second lens group having negative refractive power, and so adapted as to perform zooming from the wide position to the teleposition by narrowing the airspace reserved between the two lens groups. In said zoom lens system, at least one graded refractive index lens component is arranged in the second lens group, or at least one graded refractive index lens component is arranged in the first lens group and at least one aspherical surface is adopted in the second lens group.

9 Claims, 38 Drawing Sheets

ZOOM LENS SYSTEM

BACKGROUND OF THE INVENTION

1. Field of the Invention

The present invention relates to a zoom lens system for lens shutter cameras.

2. Description of the Prior Art

In the recent years, attempts have been made to design compacter zoom lens systems having lighter weights under the trend to manufacture compacter cameras. Especially, compact zoom lens systems having zooming ratios on the order of 2 are demanded also for lens shutter cameras which do not permit exchange of lenses.

As a zoom lens system satisfying this demand, there is known a lens system which comprises a front lens group having positive refractive power and a rear lens group having negative refractive power, and is so adapted as to perform zooming by varying the airspace reserved between the two lens groups.

Such a zoom lens system can be made compacter by minimizing radius of curvature of each lens component so as to increase power of each lens surface. However, such a measure will increase variations of aberrations during the zooming operation, cannot correct aberrations favorably and will not allow to obtain a sufficiently large zooming ratio. Further, in order to minimize variations of aberrations during the zooming operation, correct aberrations favorably and increase zooming ratio, it is necessary to increase the number of lens components or enlarge the zoom lens system as a whole contrary to the demand of compactness.

In order to correct this defect, Japanese Unexamnined Published Patents Application Nos. 148414/61, 259216/61, 295524/61, etc. disclose zoom lens systems using graded refractive index (GRIN) lenses. However, all these conventional zoom lens systems have short distances between the final surface of the lens system to the image plane, i.e., short bback focal lengths undesirable for practical use. In addition, these conventional zoom lens systems have relatively high ratios between the total lengths of the lens systems and focal lengths at the wide position, i.e., so-called telephoto ratios, and are not compact lens systems.

SUMMARY OF THE INVENTION

A primary object of the present invention is to provide a zoom lens system having a zooming ratio of 2, a small number of lens components, a long back focal length, a telephoto ratio of 1.25 or lower at the wide position, and favorably corrected distortion and other aberrations. The zoom lens system according to the present invention comprises, in the order from the object side, a first lens group having positive refractive power and a second lens group having negative refractive power, and is so adapted as to perform zooming from the wide position to the tele position by shifting said first and second lens groups so as to reduce the airspace reserved therebetween. In the composition described above, the second lens group may be divided into two subgroups as described later.

In order to reserve a sufficient back focal length and obtain a telephoto ratio of 1.25 or lower at the wide position, each lens component has strong, refractive power in the zoom lens system according to the present invention, whereby remarkable aberrations are produced by each lens surface. Further, since a unique power distribution is selected for the zoom lens system according to the present invention, positive distortion is remarkable, especially at the wide position. The positive distortion is produced under the influence caused by the lens components arranged in the second lens group having negative refractive power and, in order to correct the positive distortion, it is effective to produce negative distortion by the first lens group having positive refractive power so as to cancel the positive distortion.

However, when negative distortion is produced by increasing power of negative lens component in the first lens group, spherical aberration, coma and astigmatism will be remarkably produced by the surfaces of the negative lens component though the positive distortion is corrected nearly completely. Accordingly, it is impossible to impart the desired power to the negative lens component in the first lens group.

Since the zoom lens system according to the present invention is so designed as to reduce the airspace reserved between the two lens groups for zooming from the wide position to the tele position, height of the marginal ray passing through the second lens group is low at the wide position but is high at the tele position, whereby the second lens group produces spherical aberration at the tele position. Therefore, it is necessary to simultaneously accomplish the correction of the positive distortion at the wide position by a means other than the first lens group and the correction of the spherical aberration at the tele position. For this purpose, the zoom lens system according to the present invention adopts at least one positive lens component designed as a graded refractive index lens component in the second lens group or at least one lens surface designed as an aspherical surface in the second lens group.

When a graded refractive index lens component is used in the second lens group for the purpose described above, the lens component is the so-called radial GRIN lens having refractive index distribution in the radial direction and refractive index of the lens component is expressed by the following formula (A):

$$n(r) = n_0 n_1 r^2 + n_2 r^4 + \quad (A)$$

wherein the reference symbol $n(r)$ represents refractive index of a lens portion located at a distance (radius) $r$ from the center of the lens component, the reference symbol $n_0$ designated refractive index at the center of the lens component, the reference symbol $r$ denotes radial distance from the center of the lens component, and the reference symbols $n_1$, $n_2$, ... represent constants.

The medium of the graded refractive index lens has refractive power whose value is determined depending on the constant $n_1$ in the formula (A) and whose sign (positive or negative) is determined depending on the sign of the constant.

In order to lower telephoto ratio and produce negative distortion at the wide position, the zoom lens system according to the present invention adopts a positive lens component on the extreme object side and a negative lens component on the extreme image side in the second lens group. The negative refractive power of the second lens group is dependent on the negative lens component arranged on the extreme image side. Therefore, it is necessary, for reserving the negative refractive power of the second lens group, to increase power of the negative lens component, which produces vicious cycle to aggravate positive distortion. Accordingly, it is desirable to share the refractive power of the negative lens component arranged on the extreme image side with another lens component so as to lessen curvature of the negative lens component. For this purpose, the graded refractive index lens component adopted as the positive lens component in the second lens group should desirably satisfy the following condition (1):

$$n_1(a) > 0 \tag{1}$$

wherein the reference symbol $n_1(a)$ represents the constant $n_1$ in the formula (A) for the graded refractive index lens used as the positive lens component in the second lens group.

Under the condition (1) mentioned above, the medium of the graded refractive index lens component functions as a negative lens and the negative refractive power is shared with a lens component other than the negative lens component arranged on the extreme image side in the second lens group. Accordingly, it is possible to lessen the curvature of the negative lens component arranged on the extreme image side and minimize the distortion produced by the second lens group. Since the positive lens component arranged in the second lens group is designed as the graded refractive index lens component made of the medium having negative refractive power, it is simultaneously possible to prevent overcorrection of the spherical aberration produced at the tele position by utilizing the refraction at the incidence stage owing to the refractive index distribution formed on the surface of the lens component.

Further, in order to correct the positive distortion described above, it is effective to use at least one aspherical surface in the second lens group wherein the offaxial ray is high at the wide position. This aspherical surface should desirably have such a shape as to increase positive power, or as to decrease negative power or portions thereof are farther from the optical axis. Any lens surface located in the second lens group may be designed as the aspherical lens surface having the effect to correct the positive distortion at the wide position. However, since it is difficult and costly to manufacture an aspherical surface having a large diameter, the aspherical surface should desirably be located on the lens component which is arranged on the extreme image side and has a relatively small diameter in the second lens group.

Since the zoom lens system according to the present invention is so adapted as to perform zooming from the wide position to the tele position by shifting the two lens groups toward the object side while reducing the airspace reserved therebetween, the marginal ray which is low in the second lens group at the wide position is heightened at the tele position. Accordingly, the aspherical surface functions to aggravate spherical aberration at the tele position when the aspherical surface used for correcting the positive distortion at the wide position has the shape to increase positive refractive power as the portions thereof are farther from the optical axis as described above. Further, at the wide position at which the marginal ray is high in the first lens group, spherical aberration is influenced more greatly by the first lens group. In order to correct this spherical aberration, it is preferable to use at least one graded refractive index lens in the first lens group having positive refractive power.

That is to say, another embodiment of the zoom lens system according to the present invention has the composition described above, uses at least one graded refractive index lens in the first lens group and adopts at least one spherical surface in the second lens group. Also in this embodiment, it is desirable that the graded refractive index lens be the radial GRIN lens having the refractive index distribution expressed by the above-mentioned formula (A).

In the zoom lens system according to the present invention wherein radius of curvature is small especially on the lens surface arranged on the extreme image side in the first lens group, negative spherical aberration is produced remarkably by this lens surface. Though the spherical aberration is produced commonly from the wide position to the tele position, it is aggravated especially at the wide position. In order to correct this spherical aberration, it is therefore necessary to enlarge radius of curvature on the lens surface located on the extreme image side in the first lens group. However, when telephoto ratio is set low at the wide position as in the case of the zoom lens system according to the present invention, each lens components has strong power, thereby making it impossible to enlarge radius of curvature on the lens surface located on the extreme image side in the first lens group. For this reason, when a graded refractive index lens is used in the first lens group for correcting the negative spherical aberration produced in the entire range from the wide position to the tele position, it is desirable that the lens element arranged on the extreme image side in the first lens group should especially be a graded refractive index lens satisfying the following condition (2):

$$n_1(b) < 0 \tag{2}$$

wherein the referrence symbol $n_1(b)$ represents the constant $n_1$ in the formula (A) above for the d-line of the graded refractive index lens used as the extreme image side lens component in the first lens group.

A graded refractive index lens component satisfying the condition (2) is made of a medium having positive refractive power and can have a larger radius of curvature on the surface thereof than that of a lens component having the same refractive power and made of a homogenous medium. As a result, it is possible to enlarge radius of curvature on the lens surface located on the extreme image side in the first lens group and minimize the negative spherical aberration to be otherwise produced by the lens surface.

It is desirable for the zoom lens system according to the present invention described above to satisfy the following conditions (3) through (6):

$$0.5 < f_{p1}/f_w < 15 \tag{3}$$

$$-10 < f_{Rp}/f_{Rn} < -1 \tag{4}$$

$$0.5 < f_{Rp}/f_W \tag{5}$$

$$(D_W - D_T)/Z < 8.2 \tag{6}$$

wherein the reference symbol $f_{p1}$ represents focal length of the positive lens component arranged on the extreme object side, the reference symbol $f_{Rp}$ designates focal length of the positive lens component arranged in the second lens group, the reference symbol $f_{Rn}$ denotes focal length of the negative lens component arranged in the second lens group, the reference symbol $f_W$ represent focal length of the zoom lens system at the wide position thereof, the reference symbols $D_W$ and $D_T$ designate airspace reserved between the first and second lens groups at the wide position and tele position respectively, and the reference symbol z denotes zooming ratio.

If the lower limit of the condition (3) is exceeded, the positive lens component arranged on the extreme object side will have too strong power, thereby making it difficult to correct spherical aberration and astigmatism produced by this lens component at the tele position. If the upper limit of the condition (3) is exceeded, in contrast, the above-mentioned positive lens component will have weak power and the positive lens component arranged on the extreme image side in the first lens group must have stronger positive refractive power, thereby making it impossible to correct the spherical aberration produced by the image side surface thereof.

When the zoom lens system according to the present invention comprise five lens components, it is desirable, for increasing power of the first lens group and limiting telephoto ratio below 1.5 at the wide position, that the lens system satisfies the following condition:

$$0.5 < f_{p1}/f_W < 2.5$$

If the lower limit of the condition (4) is exceeded, distortion produced by the second lens group will become out of balance and positive distortion will be aggravated. If the upper limit of the condition (4) is exceeded, in contrast, negative distortion will be aggravated and can hardly be corrected.

By designing the zoom lens system according to the present invention so as to satisfy the conditions (3) and (4) mentioned above, it is possible to obtain a compact zoom lens system allowing very little variations aberrations even during the zooming operation.

In order to correct aberrations more favorably and making the zoom lens system compacter, it is desirable to satisfy the above-mentioned conditions (5) and (6).

The condition (5) is defined for correcting positive distortion. If the lower limit of the condition (5) is exceeded, positive distortion will be overcorrected, thereby aggravating negative distortion.

If the upper limit of the condition (6) is exceeded, the first positive lens group and the second negative lens group must be shifted for a long distance for zooming, thereby making it impossible to limit variations of aberrations to minimum during the zooming operation.

For the zoom lens system according to the present invention, it is more desirable to satisfy the following conditions (7) and (8):

$$0.4 < f_{FP}/f_W < 1.2 \qquad (7)$$

$$HH/f_W < 0.8 \qquad (8)$$

wherein the reference symbol $f_{FP}$ represents focal length of the positive lens component arranged on the extreme image side in the first lens group and the reference symbol HH designates distance between the principal points of the zoom lens system as a whole at the wide position.

If the above-mentioned positive lens component has strong power exceeding the lower limit of the condition (7), negative spherical aberration produced by the image side surface of the lens component will be too remarkable to be corrected. If the upper limit of the condition (7) is exceeded, in contrast, the other positive lens components arranged in the first lens group must have stronger power for shortening total length of the zoom lens system as a whole, and spherical aberration and astigmatism produced by these positive lens components cannot be corrected.

The condition (8) is required to keep a short total length of the zoom lens system as a whole at the wide position. If the upper limit of this condition is exceeded, it will be impossible to limit telephoto ratio to a low level at the wide position.

Also in case of a lens system which is designed so as to accomplish the object of the present invention by using a graded refractive index lens without adopting an aspherical surface in the second lens group of the zoom lens system according to the present invention, it is desirable, for correcting a spherical aberration and other aberrations favorably, to use a radial GRIN lens as the positive lens component on the extreme image side in the first lens group and design the lens system so as to satisfy the above-mentioned condition (2).

Flexibility for correcting aberrations can be increased and aberrations can be corrected more easily or more favorably when the second lens group is divided into a plural number of subgroups in the zoom lens system according to the present invention and the second lens group in shifted for zooming as described above while slightly varying the airspaces among the subgroups.

In the foregoing description, the "positive" and "negative" lens components are referred to on the basis of their shapes. Speaking more concretely, graded refractive index lens components having the shapes similar to those of positive and negative homogenous lens components are referred to as positive and negative lens components respectively.

DETAILED DESCRIPTION OF THE PREFERRED EMBODIMENTS

Figure 1:
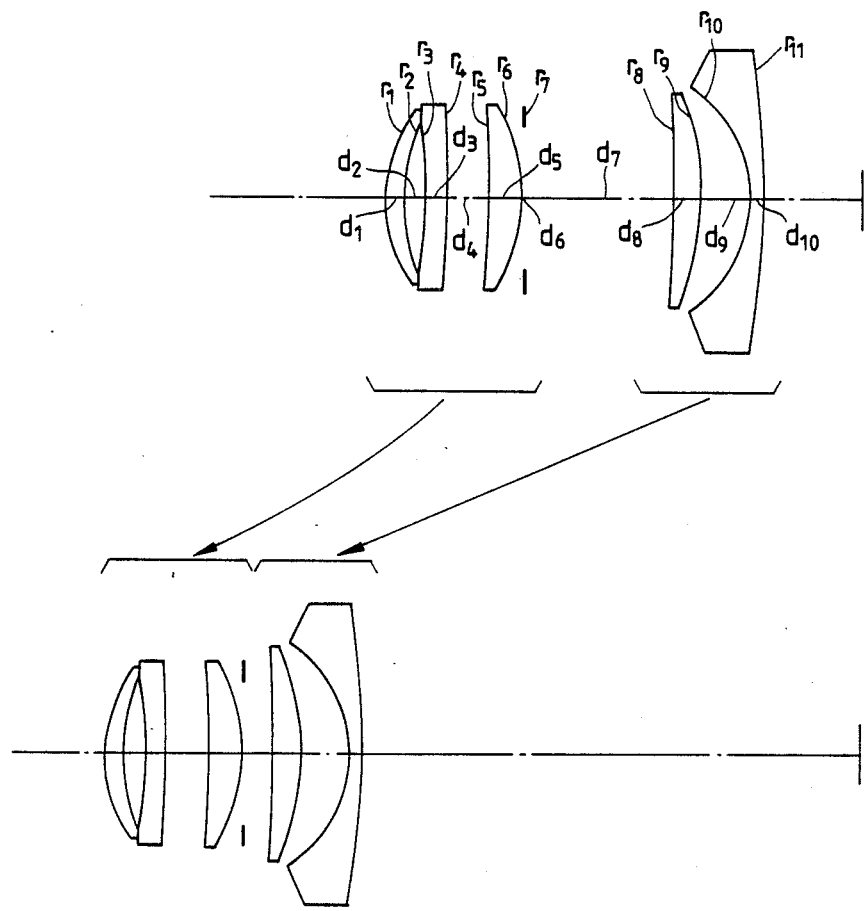
FIG. 1 through FIG. 19 show sectional views illustrating compositions of Embodiments 1 through 19 of the present invention.

Now, the preferred embodiments of the above-described zoom lens system according to the present invention will be described below.

Embodiment 1
$f = 35.0 \sim 70.0$ mm, $F/4.5 \sim F/5.6$, $f_{BW} = 8.2$ mm
$P_W = 1.14$ $r_1 = 13.6371$
  $d_1 = 1.4136$  $n_{01} = 1.75500$  $\nu_1 = 52.33$
$r_2 = 17.5563$
  $d_2 = 1.9602$
$r_3 = -35.7904$
  $d_3 = 1.7107$  $n_{02} = 1.80518$
$r_4 = -107.7855$
  $d_4 = 3.6160$
$r_5 = -84.9918$
  $d_5 = 2.8711$  $n_{03} = 1.62299$  $\nu_3 = 58.14$
$r_6 = -13.9349$
  $d_6 = 0.1406$
$r_7 = \infty$ (stop)
  $d_7$ variable $(12.413 \sim 2.193)$
$r_8 = -236.7698$
  $d_8 = 2.4999$  $n_{04} = 1.74077$
$r_9 = -23.1994$
  $d_9 = 4.1587$
$r_{10} = -11.3376$
  $d_{10} = 1.0160$  $n_{05} = 1.77250$
$r_{11} = -71.3085$ $n_{02}(d) = 1.80518 - 0.40021 \times 10^{-3} \cdot r^2 + 0.44494 \times 10^{-4} \cdot r^4$
$n_{02}(C) = 1.79591 - 0.42672 \times 10^{-3} \cdot r^2 + 0.44193 \times 10^{-4} \cdot r^4$
$n_{02}(F) = 1.82757 - 0.33836 \times 10^{-3} \cdot r^2 + 0.45197 \times 10^{-4} \cdot r^4$
$n_{04}(d) = 1.74077 + 0.25416 \times 10^{-2} \cdot r^2 + 0.74311 \times 10^{-5} \cdot r^4$
$n_{04}(C) = 1.73308 + 0.25174 \times 10^{-2} \cdot r^2 + 0.72223 \times 10^{-5} \cdot r^4$
$n_{04}(F) = 1.75974 + 0.25980 \times 10^{-2} \cdot r^2 + 0.79184 \times 10^{-5} \cdot r^4$
$n_{05}(d) = 1.77250 + 0.34266 \times 10^{-3} \cdot r^2 - 0.26210 \times 10^{-5} \cdot r^4$
$n_{05}(C) = 1.76780 + 0.32660 \times 10^{-3} \cdot r^2 - 0.25378 \times 10^{-5} \cdot r^4$
$n_{05}(F) = 1.78336 + 0.38014 \times 10^{-3} \cdot r^2 - 0.28151 \times 10^{-5} \cdot r^4$ Embodiment 2
$f = 35.0 \sim 70.0$ mm, $F/4.5 \sim F/5.6$
$f_{BW} = 8.2$ mm, $P_w = 1.14$ $r_1 = 14.7085$
  $d_1 = 1.8418$  $n_{01} = 1.75500$  $\nu_1 = 52.33$
$r_2 = 20.9042$
  $d_2 = 2.4544$
$r_3 = 18.0269$
  $d_3 = 1.1188$  $n_{02} = 1.78472$  $\nu_2 = 25.71$
$r_4 = -46.7211$
  $d_4 = 3.3592$
$r_5 = 58.7399$
  $d_5 = 2.8633$  $n_{03} = 1.57135$
$r_6 = -18.8152$
  $d_6 = 0.9381$
$r_7 = \infty$ (stop)
  $d_7$ variable $(12.928 \sim 2.139)$
$r_8 = -30.6217$
  $d_8 = 1.9907$  $n_{04} = 1.65160$
$r_9 = -14.7794$
  $d_9 = 3.1333$
$r_{10} = -11.3408$
  $d_{10} = 1.1728$  $n_{05} = 1.83400$
$r_{11} = -66.9088$ $n_{03}(d) = 1.57135 - 0.11465 \times 10^{-2} \cdot r^2 - 0.46522 \times 10^{-5} \cdot r^4$
$n_{03}(C) = 1.56811 - 0.11568 \times 10^{-2} \cdot r^2 - 0.47378 \times 10^{-5} \cdot r^4$
$n_{03}(F) = 1.57890 - 0.11278 \times 10^{-2} \cdot r^2 - 0.44934 \times 10^{-5} \cdot r^4$
$n_{04}(d) = 1.65160 + 0.70966 \times 10^{-3} \cdot r^2 + 0.79911 \times 10^{-5} \cdot r^4$
$n_{04}(C) = 1.64821 + 0.75055 \times 10^{-3} \cdot r^2 + 0.78103 \times 10^{-5} \cdot r^4$
$n_{04}(F) = 1.65932 + 0.60750 \times 10^{-3} \cdot r^2 + 0.85338 \times 10^{-5} \cdot r^4$
$n_{05}(d) = 1.83400 - 0.50637 \times 10^{-3} \cdot r^2 + 0.27698 \times 10^{-6} \cdot r^4$
$n_{05}(C) = 1.82738 - 0.49031 \times 10^{-3} \cdot r^2 + 0.29345 \times 10^{-6} \cdot r^4$
$n_{05}(F) = 1.84982 - 0.54971 \times 10^{-3} \cdot r^2 + 0.24638 \times 10^{-6} \cdot r^4$ Embodiment 3
$f = 35.0 \sim 70.0$ mm, $F/4.5 \sim F/5.6$
$f_{BW} = 8.2$ mm, $P_W = 1.14$ $r_1 = 15.4528$
  $d_1 = 1.3111$  $n_{01} = 1.75500$  $\nu_1 = 52.33$
$r_2 = 24.2133$
  $d_2 = 2.0035$
$r_3 = -19.2261$
  $d_3 = 1.1569$  $n_{02} = 1.80518$
$r_4 = -38.3303$
  $d_4 = 3.9678$
$r_5 = -6029.0384$
  $d_5 = 2.7511$  $n_{03} = 1.65160$
$r_6 = -22.7014$
  $d_6 = 0.3000$
$r_7 = \infty$ (stop)
  $d_7$ variable $(13.275 \sim 1.231)$
$r_8 = -40.7058$
  $d_8 = 2.3328$  $n_{04} = 1.74950$
$r_9 = -7.7607$
  $d_9 = 3.7270$
$r_{10} = -11.9236$
  $d_{10} = 0.9748$  $n_{05} = 1.77250$  $\nu_5 = 49.66$
$r_{11} = -55.4399$ $n_{02}(d) = 1.80518 - 0.34843 \times 10^{-3} \cdot r^2 + 0.91674 \times 10^{-6} \cdot r^4$
$n_{02}(C) = 1.79610 - 0.34740 \times 10^{-3} \cdot r^2 + 0.87154 \times 10^{-6} \cdot r^4$
$n_{02}(F) = 1.82776 - 0.35083 \times 10^{-3} \cdot r^2 + 0.10222 \times 10^{-5} \cdot r^4$
$n_{03}(d) = 1.65160 - 0.17722 \times 10^{-2} \cdot r^2 - 0.71744 \times 10^{-5} \cdot r^4$
$n_{03}(C) = 1.64821 - 0.17728 \times 10^{-2} \cdot r^2 - 0.71583 \times 10^{-5} \cdot r^4$
$n_{03}(F) = 1.65932 - 0.17708 \times 10^{-2} \cdot r^2 - 0.72119 \times 10^{-5} \cdot r^4$
$n_{04}(d) = 1.74950 + 0.18825 \times 10^{-2} \cdot r^2 + 0.92239 \times 10^{-5} \cdot r^4$
$n_{04}(C) = 1.74328 + 0.18757 \times 10^{-2} \cdot r^2 + 0.90353 \times 10^{-5} \cdot r^4$
$n_{04}(F) = 1.76453 + 0.18983 \times 10^{-2} \cdot r^2 + 0.96639 \times 10^{-5} \cdot r^4$ Embodiment 4
$f = 35.0 \sim 70.0$ mm, $F/4.5 \sim F/5.6$
$f_{BW} = 8.2$ mm, $P_W = 1.14$ $r_1 = 14.8319$ (aspherical surface)
  $d_1 = 1.2300$  $n_{01} = 1.75500$  $\nu_1 = 52.33$
$r_2 = 22.2428$
  $d_2 = 2.1159$
$r_3 = -18.6804$
  $d_3 = 1.2099$  $n_{02} = 1.80518$
$r_4 = -35.6638$
  $d_4 = 4.0095$
$r_5 = 429.9667$
  $d_5 = 2.6946$  $n_{03} = 1.64250$
$r_6 = -23.1479$
  $d_6 = 0.3000$
$r_7 = \infty$ (stop)
  $d_7$ variable $(13.179 \sim 1.411)$
$r_8 = -36.5281$
  $d_8 = 2.2723$  $n_{04} = 1.74950$
$r_9 = -17.3089$
  $d_9 = 3.7891$
$r_{10} = -11.9236$
  $d_{10} = 1.0000$  $n_{05} = 1.77250$  $\nu_5 = 49.66$
$r_{11} = -54.3284$ $n_{02}(d) = 1.80518 - 0.34843 \times 10^{-3} \cdot r^2 + 0.91674 \times 10^{-6} \cdot r^4$
$n_{02}(C) = 1.79610 - 0.34740 \times 10^{-3} \cdot r^2 + 0.87154 \times 10^{-6} \cdot r^4$
$n_{02}(F) = 1.82776 - 0.35083 \times 10^{-3} \cdot r^2 + 0.10222 \times 10^{-5} \cdot r^4$
$n_{03}(d) = 1.64250 - 0.17722 \times 10^{-2} \cdot r^2 - 0.71744 \times 10^{-5} \cdot r^4$
$n_{03}(C) = 1.63914 - 0.17728 \times 10^{-2} \cdot r^2 - 0.71583 \times 10^{-5} \cdot r^4$
$n_{03}(F) = 1.65015 - 0.17708 \times 10^{-2} \cdot r^2 - 0.72119 \times 10^{-5} \cdot r^4$
$n_{04}(d) = 1.74950 + 0.18825 \times 10^{-2} \cdot r^2 + 0.92239 \times 10^{-5} \cdot r^4$
$n_{04}(C) = 1.74328 + 0.18757 \times 10^{-2} \cdot r^2 + 0.90353 \times 10^{-5} \cdot r^4$
$n_{04}(F) = 1.76453 + 0.18983 \times 10^{-2} \cdot r^2 + 0.96639 \times 10^{-5} \cdot r^4$
aspherical surface coefficients
$E = 0.13658 \times 10^{-5}$, $F = 0.28078 \times 10^{-7}$
$G = -0.23301 \times 10^{-9}$ -continued

Embodiment 5
$f = 35.0 \sim 70.0$ mm, F/4.5~F/5.6
$f_{BW} = 8.2$ mm, $P_W = 1.14$ $r_1 = 15.4363$
$\quad d_1 = 1.4857 \quad n_{01} = 1.75500 \quad \nu_1 = 52.33$
$r_2 = 24.2529$ (aspherical surface)
$\quad d_2 = 2.0980$
$r_3 = -19.2206$
$\quad d_3 = 1.1989 \quad n_{02} = 1.80518$
$r_4 = -38.4687$
$\quad d_4 = 3.9932$
$r_5 = 2333.4570$
$\quad d_5 = 2.7308 \quad n_{03} = 1.65160$
$r_6 = -22.6839$
$\quad d_6 = 0.3000$
$r_7 = \infty$ (stop)
$\quad d_7$ variable (12.790~1.231)
$r_8 = -41.0194$
$\quad d_8 = 2.2742 \quad n_{04} = 1.74950$
$r_9 = -17.7579$
$\quad d_9 = 3.6343$
$r_{10} = -11.9182$
$\quad d_{10} = 1.2946 \quad n_{05} = 1.77250 \quad \nu_5 = 49.66$
$r_{11} = -60.4701$ $n_{02}(d) = 1.80518 - 0.26867 \times 10^{-3} \cdot r^2 - 0.16492 \times 10^{-6} \cdot r^4$
$n_{02}(C) = 1.79610 - 0.26872 \times 10^{-3} \cdot r^2 - 0.22115 \times 10^{-6} \cdot r^4$
$n_{02}(F) = 1.82776 - 0.26859 \times 10^{-3} \cdot r^2 - 0.60500 \times 10^{-7} \cdot r^4$
$n_{03}(d) = 1.65160 - 0.18323 \times 10^{-2} \cdot r^2 - 0.71720 \times 10^{-5} \cdot r^4$
$n_{03}(C) = 1.64821 - 0.18336 \times 10^{-2} \cdot r^2 - 0.71688 \times 10^{-5} \cdot r^4$
$n_{03}(F) = 1.65932 - 0.18283 \times 10^{-2} \cdot r^2 - 0.71780 \times 10^{-5} \cdot r^4$
$n_{04}(d) = 1.74950 + 0.19263 \times 10^{-2} \cdot r^2 + 0.92887 \times 10^{-5} \cdot r^4$
$n_{04}(C) = 1.74328 + 0.19214 \times 10^{-2} \cdot r^2 + 0.91660 \times 10^{-5} \cdot r^4$
$n_{04}(F) = 1.76453 + 0.19410 \times 10^{-2} \cdot r^2 + 0.96569 \times 10^{-5} \cdot r^4$
aspherical surface coefficients
$E = -0.97173 \times 10^{-6}$, $F = -0.22867 \times 10^{-7}$
$G = 0.10768 \times 10^{-8}$

Embodiment 6
$f = 35.0 \sim 70.0$ mm, F/4.5~F/5.6
$f_{BW} = 8.2$ mm, $P_W = 1.14$ $r_1 = 14.6445$
$\quad d_1 = 1.3491 \quad n_{01} = 1.75500 \quad \nu_1 = 52.33$
$r_2 = 21.9641$
$\quad d_2 = 2.1998$
$r_3 = -19.5442$
$\quad d_3 = 1.1998 \quad n_{02} = 1.80518$
$r_4 = -39.2952$
$\quad d_4 = 4.1421$
$r_5 = 205.1252$
$\quad d_5 = 2.5463 \quad n_{03} = 1.65160$
$r_6 = -24.4598$
$\quad d_6 = 0.3000$
$r_7 = \infty$ (stop)
$\quad d_7$ variable (12.937~1.231)
$r_8 = -43.4207$
$\quad d_8 = 2.4184 \quad n_{04} = 1.74950$
$r_9 = -17.5018$
$\quad d_9 = 3.5072$
$r_{10} = -11.7586$
$\quad d_{10} = 1.1998 \quad n_{05} = 1.77250 \quad \nu_5 = 49.66$
$r_{11} = -61.0867$ (aspherical surface)

$n_{02}(d) = 1.80518 - 0.28294 \times 10^{-3} \cdot r^2 - 0.40304 \times 10^{-7} \cdot r^4$
$n_{02}(C) = 1.79610 - 0.28292 \times 10^{-3} \cdot r^2 - 0.96158 \times 10^{-7} \cdot r^4$
$n_{02}(F) = 1.82776 - 0.28298 \times 10^{-3} \cdot r^2 + 0.90021 \times 10^{-7} \cdot r^4$
$n_{03}(d) = 1.65160 - 0.18246 \times 10^{-2} \cdot r^2 - 0.80643 \times 10^{-5} \cdot r^4$
$n_{03}(C) = 1.64821 - 0.18264 \times 10^{-2} \cdot r^2 - 0.80751 \times 10^{-5} \cdot r^4$
$n_{03}(F) = 1.65932 - 0.18201 \times 10^{-2} \cdot r^2 - 0.80392 \times 10^{-5} \cdot r^4$
$n_{04}(d) = 1.74950 + 0.19075 \times 10^{-2} \cdot r^2 + 0.92067 \times 10^{-5} \cdot r^4$
$n_{04}(C) = 1.74328 + 0.19010 \times 10^{-2} \cdot r^2 + 0.90111 \times 10^{-5} \cdot r^4$
$n_{04}(F) = 1.76453 + 0.19231 \times 10^{-2} \cdot r^2 + 0.96632 \times 10^{-5} \cdot r^4$
aspherical surface coefficients
$E = -0.41896 \times 10^{-5}$, $F = 0.73167 \times 10^{-7}$
$G = -0.28921 \times 10^{-9}$

Embodiment 7
$f = 35.0 \sim 70.0$ mm, F/4.5~F/5.6
$f_{BW} = 8.2$ mm, $P_W = 1.09$ $r_1 = 12.5726$ (aspherical surface)
$\quad d_1 = 1.8958 \quad n_{01} = 1.74320 \quad \nu_1 = 49.31$
$r_2 = 19.7940$
$\quad d_2 = 2.0030$
$r_3 = -18.3821$
$\quad d_3 = 1.0006 \quad n_{02} = 1.80518 \quad \nu_2 = 25.43$
$r_4 = -89.8892$
$\quad d_4 = 3.0754$
$r_5 = 74.5095$
$\quad d_5 = 1.7069 \quad n_{03} = 1.61765$
$r_6 = -16.9834$
$\quad d_6 = 0.3849$
$r_7 = \infty$ (stop)
$\quad d_7$ variable (12.916~1.720)
$r_8 = -41.0496$
$\quad d_8 = 1.9435 \quad n_{04} = 1.74950$
$r_9 = -17.1958$
$\quad d_9 = 3.5933$
$r_{10} = -11.0416$
$\quad d_{10} = 1.2800 \quad n_{05} = 1.77250 \quad \nu_5 = 49.66$
$r_{11} = -50.1112$ $n_{02}(d) = 1.80518 + 0.12217 \times 10^{-2} \cdot r^2 - 0.12002 \times 10^{-5} \cdot r^4$
$n_{02}(C) = 1.79609 + 0.12159 \times 10^{-2} \cdot r^2 - 0.13228 \times 10^{-5} \cdot r^4$
$n_{02}(F) = 1.82775 + 0.12352 \times 10^{-2} \cdot r^2 - 0.91424 \times 10^{-6} \cdot r^4$
$n_{03}(d) = 1.61765 - 0.14296 \times 10^{-2} \cdot r^2 - 0.94554 \times 10^{-5} \cdot r^4$
$n_{03}(C) = 1.61425 - 0.14334 \times 10^{-2} \cdot r^2 - 0.94973 \times 10^{-5} \cdot r^4$
$n_{03}(F) = 1.62547 - 0.14208 \times 10^{-2} \cdot r^2 - 0.93575 \times 10^{-5} \cdot r^4$
$n_{04}(d) = 1.74950 + 0.23389 \times 10^{-2} \cdot r^2 + 0.13302 \times 10^{-4} \cdot r^4$
$n_{04}(C) = 1.74328 + 0.23349 \times 10^{-2} \cdot r^2 + 0.13065 \times 10^{-4} \cdot r^4$
$n_{04}(F) = 1.76453 + 0.23482 \times 10^{-2} \cdot r^2 + 0.13854 \times 10^{-4} \cdot r^4$
aspherical surface coefficients
$E = 0.20143 \times 10^{-4}$, $F = 0.17956 \times 10^{-6}$
$G = 0.79702 \times 10^{-8}$

Embodiments 8
$f = 35.0 \sim 70.0$ mm, F/4.5~F/5.6
$f_{BW} = 8.2$ mm, $P_W = 1.14$ $r_1 = 15.4527$
$\quad d_1 = 1.3137 \quad n_{01} = 1.75500 \quad \nu_1 = 52.33$
$r_2 = 24.3372$
$\quad d_2 = 1.9792$
$r_3 = -19.2084$
$\quad d_3 = 1.1935 \quad n_{02} = 1.80518$
$r_4 = -38.2095$
$\quad d_4 = 4.1577$
$r_5 = 5926.5422$
$\quad d_5 = 2.5335 \quad n_{03} = 1.65160$
$r_6 = -22.8478$
$\quad d_6 = 0.2614$
$r_7 = \infty$ (stop)
$\quad d_7$ variable (12.512~1.998)
$r_8 = -41.8496$
$\quad d_8 = 2.2374 \quad n_{04} = 1.74950$
$r_9 = -17.6776$
$\quad d_9$ variable (4.411~3.736)
$r_{10} = -11.7530$
$\quad d_{10} = 1.1997 \quad n_{05} = 1.77250 \quad \nu_5 = 49.66$
$r_{11} = -60.2779$ $n_{02}(d) = 1.80518 - 0.23934 \times 10^{-3} \cdot r^2 - 0.91348 \times 10^{-6} \cdot r^4$
$n_{02}(C) = 1.79610 - 0.23900 \times 10^{-3} \cdot r^2 - 0.92592 \times 10^{-6} \cdot r^4$
$n_{02}(F) = 1.82776 - 0.24013 \times 10^{-3} \cdot r^2 - 0.88446 \times 10^{-6} \cdot r^4$
$n_{03}(d) = 1.65160 - 0.18737 \times 10^{-2} \cdot r^2 - 0.76291 \times 10^{-5} \cdot r^4$
$n_{03}(C) = 1.64821 - 0.18757 \times 10^{-2} \cdot r^2 - 0.76554 \times 10^{-5} \cdot r^4$
$n_{03}(F) = 1.65932 - 0.18691 \times 10^{-2} \cdot r^2 - 0.75677 \times 10^{-5} \cdot r^4$
$n_{04}(d) = 1.74950 + 0.19556 \times 10^{-2} \cdot r^2 + 0.88828 \times 10^{-5} \cdot r^4$
$n_{04}(C) = 1.74328 + 0.19497 \times 10^{-2} \cdot r^2 + 0.86410 \times 10^{-5} \cdot r^4$
$n_{04}(F) = 1.76453 + 0.19693 \times 10^{-2} \cdot r^2 + 0.94470 \times 10^{-5} \cdot r^4$

Embodiment 9
$f = 35.0 \sim 70.0$ mm, F/4.5~F/5.6
$f_{BW} = 8.2$ mm, $P_W = 1.14$ $r_1 = 13.4178$ (aspherical surface)
$\quad d_1 = 1.5026 \quad n_{01} = 1.74100 \quad \nu_1 = 52.68$
$r_2 = 20.0852$
$\quad d_2 = 2.0614$
$r_3 = -18.5860$
$\quad d_3 = 1.0135 \quad n_{02} = 1.85026 \quad \nu_2 = 32.28$
$r_4 = -66.8744$
$\quad d_4 = 3.2243$
$r_5 = 74.5313$
$\quad d_5 = 3.0825 \quad n_{03} = 1.62299$
$r_6 = -21.1356$
$\quad d_6 = 0.1703$
$r_7 = \infty$ (stop)
$\quad d_7$ variable (13.143~1.862)

-continued

| | | |
|---|---|---|
| $r_8 = -36.1525$ | | |
| | $d_8 = 2.0249$ | $n_{04} = 1.72342$ |
| $r_9 = -17.8334$ | | |
| | $d_9$ variable (4.370~4.215) | |
| $r_{10} = -12.0101$ | | |
| | $d_{10} = 1.2080$ | $n_{05} = 1.77250$ $\nu_5 = 49.66$ |
| $r_{11} = -52.5280$ | | |

$n_{03}(d) = 1.62299 - 0.17789 \times 10^{-2} \cdot r^2 - 0.65990 \times 10^{-5} \cdot r^4$
$n_{03}(C) = 1.61974 - 0.17859 \times 10^{-2} \cdot r^2 - 0.66364 \times 10^{-5} \cdot r^4$
$n_{03}(F) = 1.63045 - 0.17625 \times 10^{-2} \cdot r^2 - 0.65118 \times 10^{-5} \cdot r^4$
$n_{04}(d) = 1.72342 + 0.19394 \times 10^{-2} \cdot r^2 + 0.94928 \times 10^{-5} \cdot r^4$
$n_{04}(C) = 1.71783 + 0.19477 \times 10^{-2} \cdot r^2 + 0.93514 \times 10^{-5} \cdot r^4$
$n_{04}(F) = 1.73689 + 0.19201 \times 10^{-2} \cdot r^2 + 0.98225 \times 10^{-5} \cdot r^4$ aspherical surface coefficients
$E = 0.11519 \times 10^{-4}$, $F = 0.12714 \times 10^{-6}$
$G = 0.29226 \times 10^{-8}$

Embodiment 10
$f = 35.0 \sim 70.0$ mm, $F/4.5 \sim F/5.6$
$f_{BW} = 8.2$ mm, $P_W = 1.09$

| | | |
|---|---|---|
| $r_1 = 12.5534$ (aspherical surface) | | |
| | $d_1 = 1.9516$ | $n_{01} = 1.78590$ $\nu_1 = 44.18$ |
| $r_2 = 19.6610$ | | |
| | $d_2 = 2.1992$ | |
| $r_3 = -18.3996$ | | |
| | $d_3 = 1.1993$ | $n_{02} = 1.80518$ |
| $r_4 = -85.8395$ | | |
| | $d_4 = 2.6772$ | |
| $r_5 = 148.7574$ | | |
| | $d_5 = 1.8381$ | $n_{03} = 1.61484$ |
| $r_6 = -16.8495$ | | |
| | $d_6 = 0.3849$ | |
| $r_7 =$ (stop) | | |
| | $d_7$ variable (10.825~1.999) | |
| $r_8 = -45.1187$ | | |
| | $d_8 = 1.9720$ | $n_{04} = 1.72342$ |
| $r_9 = -17.2492$ | | |
| | $d_9$ variable (5.154~3.658) | |
| $r_{10} = -10.8982$ | | |
| | $d_{10} = 1.5992$ | $n_{05} = 1.77250$ $\nu_5 = 49.66$ |
| $r_{11} = -43.9954$ | | |

$n_{02}(d) = 1.80518 + 0.16608 \times 10^{-2} \cdot r^2 - 0.17735 \times 10^{-4} \cdot r^4$
$n_{02}(C) = 1.79609 + 0.16444 \times 10^{-2} \cdot r^2 - 0.17888 \times 10^{-4} \cdot r^4$
$n_{02}(F) = 1.82775 + 0.16925 \times 10^{-2} \cdot r^2 - 0.17445 \times 10^{-4} \cdot r^4$
$n_{03}(d) = 1.61484 - 0.21705 \times 10^{-2} \cdot r^2 - 0.11409 \times 10^{-4} \cdot r^4$
$n_{03}(C) = 1.61124 - 0.21882 \times 10^{-2} \cdot r^2 - 0.11458 \times 10^{-4} \cdot r^4$
$n_{03}(F) = 1.62325 - 0.21377 \times 10^{-2} \cdot r^2 - 0.11261 \times 10^{-4} \cdot r^4$
$n_{04}(d) = 1.72342 + 0.27036 \times 10^{-2} \cdot r^2 + 0.12256 \times 10^{-4} \cdot r^4$
$n_{04}(C) = 1.71783 + 0.27095 \times 10^{-2} \cdot r^2 + 0.12095 \times 10^{-4} \cdot r^4$
$n_{04}(F) = 1.73689 + 0.26926 \times 10^{-2} \cdot r^2 + 0.12522 \times 10^{-4} \cdot r^4$ aspherical surface coefficients
$E = 0.17568 \times 10^{-4}$, $F = 0.91207 \times 10^{-7}$
$G = 0.31951 \times 10^{-8}$

Embodiment 11
$f = 36.0 \sim 68.0$ mm, $F/3.6 \sim F/6.7$
$f_{BW} = 7.0$ mm, $P_W = 1.11$

| | | |
|---|---|---|
| $r_1 = 13.3104$ | | |
| | $d_1 = 1.2015$ | $n_{01} = 1.75500$ $\nu_1 = 52.33$ |
| $r_2 = 21.7463$ | | |
| | $d_2 = 1.9030$ | |
| $r_3 = -24.5194$ | | |
| | $d_3 = 1.1019$ | $n_{02} = 1.80518$ $\nu_2 = 25.43$ |
| $r_4 = -344.9166$ | | |
| | $d_4 = 2.5831$ | |
| $r_5 = 290.7556$ | | |
| | $d_5 = 2.9514$ | $n_{03} = 1.62374$ |
| $r_6 = -19.8647$ | | |
| | $d_6 = 0.4133$ | |
| $r_7 = \infty$ (stop) | | |
| | $d_7$ variable (14.042~2.002) | |
| $r_8 = -32.3539$ (aspherical surface) | | |
| | $d_8 = 2.4277$ | $n_{04} = 1.49216$ $\nu_4 = 57.50$ |
| $r_9 = -16.7479$ | | |
| | $d_9 = 3.6403$ | |
| $r_{10} = -11.0696$ | | |
| | $d_{10} = 2.7362$ | $n_{05} = 1.77250$ $\nu_5 = 49.66$ |
| $r_{11} = -36.6742$ | | |

$n_{03}(d) = 1.62374 - 0.15478 \times 10^{-2} \cdot r^2 - 0.30247 \times 10^{-5} \cdot r^4$
$n_{03}(C) = 1.61978 - 0.15390 \times 10^{-2} \cdot r^2 - 0.30271 \times 10^{-5} \cdot r^4$
$n_{03}(F) = 1.63303 - 0.15683 \times 10^{-2} \cdot r^2 - 0.30190 \times 10^{-5} \cdot r^4$ aspherical surface coefficients
$E = 0.45937 \times 10^{-4}$, $F = 0.36420 \times 10^{-6}$
$G = 0.90903 \times 10^{-9}$

Embodiment 12
$f = 36.0 \sim 68.0$ mm, $F/3.6 \sim F/6.7$
$f_{BW} = 7.0$ mm, $P_W = 1.11$

| | | |
|---|---|---|
| $r_1 = 11.9856$ | | |
| | $d_1 = 1.2000$ | $n_{01} = 1.72916$ $\nu_1 = 54.68$ |
| $r_2 = 17.6127$ | | |
| | $d_2 = 1.9030$ | |
| $r_3 = -21.4312$ | | |
| | $d_3 = 1.0015$ | $n_{02} = 1.80518$ $\nu_2 = 25.43$ |
| $r_4 = -76.9546$ | | |
| | $d_4 = 2.4179$ | |
| $r_5 = -253.3866$ | | |
| | $d_5 = 2.4765$ | $n_{03} = 1.62299$ |
| $r_6 = -18.0128$ | | |
| | $d_6 = 0.4133$ | |
| $r_7 = \infty$ (stop) | | |
| | $d_7$ variable (15.531~1.800) | |
| $r_8 = -25.2956$ | | |
| | $d_8 = 2.2281$ | $n_{04} = 1.80440$ $\nu_4 = 39.58$ |
| $r_9 = -17.4603$ (aspherical surface) | | |
| | $d_9 = 3.7932$ | |
| $r_{10} = 12.0742$ | | |
| | $d_{10} = 2.0360$ | $n_{05} = 1.77250$ $\nu_5 = 49.66$ |
| $r_{11} = -42.7128$ | | |

$n_{03}(d) = 1.62299 - 0.16238 \times 10^{-2} \cdot r^2 + 0.23682 \times 10^{-6} \cdot r^4$
$n_{03}(C) = 1.61974 - 0.16100 \times 10^{-2} \cdot r^2 + 0.31600 \times 10^{-6} \cdot r^4$
$n_{03}(F) = 1.63045 - 0.16559 \times 10^{-2} \cdot r^2 + 0.52072 \times 10^{-7} \cdot r^4$ aspherical surface coefficients
$E = -0.24361 \times 10^{-4}$, $F = 0.10643 \times 10^{-6}$
$G = -0.32755 \times 10^{-8}$

Embodiment 13
$f = 36.0 \sim 68.0$ mm, $F/3.6 \sim F/6.7$
$f_{BW} = 7.0$ mm, $P_W = 1.11$

| | | |
|---|---|---|
| $r_1 = 12.3000$ | | |
| | $d_1 = 1.2000$ | $n_{01} = 1.75500$ $\nu_1 = 52.33$ |
| $r_2 = 18.0482$ | | |
| | $d_2 = 1.9030$ | |
| $r_3 = -21.5952$ | | |
| | $d_3 = 1.0015$ | $n_{02} = 1.80518$ $\nu_2 = 25.43$ |
| $r_4 = -73.6082$ | | |
| | $d_4 = 2.4130$ | |
| $r_5 = -196.7134$ | | |
| | $d_5 = 2.6003$ | $n_{03} = 1.62299$ |
| $r_6 = -18.2583$ | | |
| | $d_6 = 0.4133$ | |
| $r_7 = \infty$ (stop) | | |
| | $d_7$ variable (15.480~2.002) | |
| $r_8 = -22.1839$ | | |
| | $d_8 = 2.2281$ | $n_{04} = 1.76200$ $\nu_4 = 40.10$ |
| $r_9 = -15.4090$ | | |
| | $d_9 = 3.7581$ | |
| $r_{10} = -12.4399$ (aspherical surface) | | |
| | $d_{10} = 2.0026$ | $n_{05} = 1.77250$ $\nu_5 = 49.66$ |
| $r_{11} = -52.4285$ | | |

$n_{03}(d) = 1.62299 - 0.16229 \times 10^{-2} \cdot r^2 - 0.32213 \times 10^{-6} \cdot r^4$
$n_{03}(C) = 1.61974 - 0.16151 \times 10^{-2} \cdot r^2 - 0.32721 \times 10^{-6} \cdot r^4$
$n_{03}(F) = 1.63045 - 0.16411 \times 10^{-2} \cdot r^2 - 0.31028 \times 10^{-6} \cdot r^4$ aspherical surface coefficients
$E = 0.22033 \times 10^{-4}$, $F = -0.22755 \times 10^{-6}$
$G = 0.41794 \times 10^{-8}$

Embodiment 14
$f = 36.0 \sim 68.0$ mm, $F/3.6 \sim F/6.7$
$f_{BW} = 7.0$ mm, $P_W = 1.11$

| | | |
|---|---|---|
| $r_1 = 13.3624$ | | |
| | $d_1 = 1.3112$ | $n_{01} = 1.75500$ $\nu_1 = 52.33$ |
| $r_2 = 21.1649$ | | |
| | $d_2 = 1.9030$ | |
| $r_3 = -22.0422$ | | |
| | $d_3 = 1.1019$ | $n_{02} = 1.80518$ $\nu_2 = 25.43$ |
| $r_4 = -102.6020$ | | |
| | $d_4 = 2.4438$ | |
| $r_5 = -2120.0017$ | | |
| | $d_5 = 2.6003$ | $n_{03} = 1.62299$ |

-continued

| | |
|---|---|
| $r_6 = -18.5745$ | |
| | $d_6 = 0.4133$ |
| $r_7 = \infty$ (stop) | |
| | $d_7$ variable (14.852~2.002) |
| $r_8 = -25.8310$ (aspherical surface) | |
| | $d_8 = 2.3014 \quad n_{04} = 1.76200 \quad \nu_4 = 40.10$ |
| $r_9 = -17.7432$ | |
| | $d_9 = 3.9299$ |
| $r_{10} = -11.4469$ | |
| | $d_{10} = 2.1432 \quad n_{05} = 1.77250 \quad \nu_5 = 49.66$ |
| $r_{11} = -37.0819$ | |

$n_{03}(d) = 1.62299 - 0.15322 \times 10^{-2} \cdot r^2 - 0.26903 \times 10^{-5} \cdot r^4$
$n_{03}(C) = 1.61974 - 0.15214 \times 10^{-2} \cdot r^2 - 0.26169 \times 10^{-5} \cdot r^4$
$n_{03}(F) = 1.63045 - 0.15574 \times 10^{-2} \cdot r^2 - 0.28616 \times 10^{-5} \cdot r^4$
aspherical surface coefficients
$E = 0.29302 \times 10^{-4}, F = 0.18157 \times 10^{-6}$
$G = 0.12399 \times 10^{-8}$ Embodiment 15
$f = 36.0 \sim 68.0$ mm, $F/3.6 \sim F/6.7$
$f_{BW} = 7.0$ mm, $P_W = 1.11$

| | |
|---|---|
| $r_1 = 12.0713$ | |
| | $d_1 = 1.2000 \quad n_{01} = 1.74100 \quad \nu_1 = 52.68$ |
| $r_2 = 17.6036$ | |
| | $d_2 = 1.9141$ |
| $r_3 = -21.1126$ | |
| | $d_3 = 1.0015 \quad n_{02} = 1.80518 \quad \nu_2 = 25.43$ |
| $r_4 = -75.9944$ | |
| | $d_4$ variable (2.390~2.419) |
| $r_5 = -266.3601$ | |
| | $d_5 = 2.5587 \quad n_{03} = 1.62299$ |
| $r_6 = -18.0025$ | |
| | $d_6 = 0.4133$ |
| $r_7 = \infty$ (stop) | |
| | $d_7$ variable (15.778~2.248) |
| $r_8 = -21.5336$ | |
| | $d_8 = 2.1104 \quad n_{04} = 1.76200 \quad \nu_4 = 40.10$ |
| $r_9 = -15.2036$ | |
| | $d_9 = 3.7292$ |
| $r_{10} = -12.4294$ (aspherical surface) | |
| | $d_{10} = 1.9043 \quad n_{05} = 1.77250 \quad \nu_5 = 49.66$ |
| $r_{11} = -50.6120$ | |

$n_{03}(d) = 1.62299 - 0.16229 \times 10^{-2} \cdot r^2 - 0.32213 \times 10^{-6} \cdot r^4$
$n_{03}(C) = 1.61974 - 0.16117 \times 10^{-2} \cdot r^2 - 0.24668 \times 10^{-6} \cdot r^4$
$n_{03}(F) = 1.63045 - 0.16491 \times 10^{-2} \cdot r^2 - 0.49817 \times 10^{-6} \cdot r^4$
aspherical surface coefficients
$E = 0.26892 \times 10^{-4}, F = -0.18363 \times 10^{-6}$
$G = 0.36859 \times 10^{-8}$ Embodiment 16
$f = 36.0 \sim 68.0$ mm, $F/3.6 \sim F/6.7$
$f_{BW} = 7.0$ mm, $P_W = 1.11$

| | |
|---|---|
| $r_1 = 13.3967$ | |
| | $d_1 = 1.3112 \quad n_{01} = 1.75500 \quad \nu_1 = 52.33$ |
| $r_2 = 21.2118$ | |
| | $d_2$ variable (1.800~1.838) |
| $r_3 = -22.0001$ | |
| | $d_3 = 1.0891 \quad n_{02} = 1.80518 \quad \nu_2 = 25.43$ |
| $r_4 = -107.1734$ | |
| | $d_4 = 2.4437$ |
| $r_5 = 4008.4631$ | |
| | $d_5 = 2.5842 \quad n_{03} = 1.62299$ |
| $r_6 = -18.4974$ | |
| | $d_6 = 0.4133$ |
| $r_7 = \infty$ (stop) | |
| | $d_7$ variable (14.934~2.000) |
| $r_8 = -24.7208$ (aspherical surface) | |
| | $d_8 = 2.3065 \quad n_{04} = 1.76200 \quad \nu_4 = 40.10$ |
| $r_9 = -17.5146$ | |
| | $d_9 = 3.9275$ |
| $r_{10} = -11.4849$ | |
| | $d_{10} = 2.1909 \quad n_{05} = 1.77250 \quad \nu_5 = 49.66$ |
| $r_{11} = -35.6408$ | |

$n_{03}(d) = 1.62299 - 0.15281 \times 10^{-2} \cdot r^2 - 0.28690 \times 10^{-5} \cdot r^4$
$n_{03}(C) = 1.61974 - 0.15158 \times 10^{-2} \cdot r^2 - 0.27787 \times 10^{-5} \cdot r^4$
$n_{03}(F) = 1.63045 - 0.15568 \times 10^{-2} \cdot r^2 - 0.30798 \times 10^{-5} \cdot r^4$
aspherical surface coefficients
$E = 0.31767 \times 10^{-4}, F = 0.13889 \times 10^{-6}$
$G = 0.13958 \times 10^{-8}$ -continued Embodiment 17
$f = 36.0 \sim 68.0$ mm, $F/3.6 \sim F/6.7$
$f_{BW} = 7.0$ mm, $P_W = 1.11$

| | |
|---|---|
| $r_1 = 12.1482$ | |
| | $d_1 = 1.2000 \quad n_{01} = 1.74100 \quad \nu_1 = 52.68$ |
| $r_2 = 17.7698$ | |
| | $d_2 = 1.8482$ |
| $r_3 = -20.4606$ | |
| | $d_3 = 1.0015 \quad n_{02} = 1.80518 \quad \nu_2 = 25.43$ |
| $r_4 = -72.4723$ | |
| | $d_4 = 2.3899$ |
| $r_5 = -199.2207$ | |
| | $d_5 = 2.4083 \quad n_{03} = 1.62299$ |
| $r_6 = -17.2408$ | |
| | $d_6 = 0.4133$ |
| $r_7 = \infty$ (stop) | |
| | $d_7$ variable (16.219~2.231) |
| $r_8 = -21.7804$ | |
| | $d_8 = 2.1104 \quad n_{04} = 1.76200 \quad \nu_4 = 40.10$ |
| $r_9 = -15.3604$ | |
| | $d_9$ variable (3.609~3.699) |
| $r_{10} = -12.7512$ (aspherical surface) | |
| | $d_{10} = 1.8004 \quad n_{05} = 1.77250 \quad \nu_5 = 49.66$ |
| $r_{11} = -53.1859$ | |

$n_{03}(d) = 1.62299 - 0.16413 \times 10^{-2} \cdot r^2 - 0.98205 \times 10^{-6} \cdot r^4$
$n_{03}(C) = 1.61974 - 0.16300 \times 10^{-2} \cdot r^2 - 0.87052 \times 10^{-6} \cdot r^4$
$n_{03}(F) = 1.63045 - 0.16678 \times 10^{-2} \cdot r^2 - 0.12423 \times 10^{-5} \cdot r^4$
aspherical surface coefficients
$E = 0.23634 \times 10^{-4}, F = -0.18238 \times 10^{-6}$
$G = 0.32492 \times 10^{-8}$ Embodiment 18
$f = 36.0 \sim 68.0$ mm, $F/4.6 \sim F/5.7$
$f_{BW} = 7.7$ mm, $P_W = 1.22$

| | |
|---|---|
| $r_1 = 38.9204$ | |
| | $d_1 = 2.5093 \quad n_{01} = 1.60311$ |
| $r_2 = 43.6307$ | |
| | $d_2 = 4.6361$ |
| $r_3 = \infty$ (stop) | |
| | $d_3 = 3.2576$ |
| $r_4 = -57.0376$ | |
| | $d_4 = 3.0215 \quad n_{02} = 1.60311$ |
| $r_5 = -14.2817$ | |
| | $d_5$ variable (13.819~2.568) |
| $r_6 = -23.4348$ (aspherical surface) | |
| | $d_6 = 3.3659 \quad n_{03} = 1.58913 \quad \nu_3 = 60.97$ |
| $r_7 = -19.1641$ | |
| | $d_7 = 4.1762$ |
| $r_8 = -12.7424$ | |
| | $d_8 = 1.4700 \quad n_{04} = 1.74320 \quad \nu_4 = 49.31$ |
| $r_9 = -38.5289$ | |

$n_{01}(d) = 1.60311 - 0.52215 \times 10^{-3} \cdot r^2 + 0.12795 \times 10^{-4} \cdot r^4 + 0.82122 \times 10^{-7} \cdot r^6$
$n_{01}(C) = 1.60024 - 0.53549 \times 10^{-3} \cdot r^2 + 0.12701 \times 10^{-4} \cdot r^4 + 0.81682 \times 10^{-7} \cdot r^6$
$n_{01}(F) = 1.61017 - 0.48933 \times 10^{-3} \cdot r^2 + 0.13026 \times 10^{-4} \cdot r^4 + 0.83205 \times 10^{-7} \cdot r^6$
$n_{02}(d) = 1.60311 - 0.31362 \times 10^{-3} \cdot r^2 + 0.51626 \times 10^{-6} \cdot r^4 + 0.63636 \times 10^{-7} \cdot r^6$
$n_{02}(C) = 1.60008 - 0.30832 \times 10^{-3} \cdot r^2 - 0.57210 \times 10^{-6} \cdot r^4 + 0.63286 \times 10^{-7} \cdot r^6$
$n_{02}(F) = 1.61002 - 0.32571 \times 10^{-3} \cdot r^2 - 0.38892 \times 10^{-6} \cdot r^4 + 0.64434 \times 10^{-7} \cdot r^6$
aspherical surface coefficients
$E = 0.32382 \times 10^{-4}, F = 0.23966 \times 10^{-6}$
$G = 0.81673 \times 10^{-9}, H = -0.11821 \times 10^{-11}$ Embodiment 19
$f = 36.0 \sim 68.0$ mm, $F/4.6 \sim F/5.7$
$f_{BW} = 7.9$ mm, $P_W = 1.25$

| | |
|---|---|
| $r_1 = 50.1708$ | |
| | $d_1 = 2.5829 \quad n_{01} = 1.60311$ |
| $r_2 = 47.6212$ | |
| | $d_2 = 4.7629$ |
| $r_3 = \infty$ (stop) | |
| | $d_3 = 3.4884$ |
| $r_4 = -79.3179$ | |
| | $d_4 = 3.1657 \quad n_{02} = 1.60311$ |
| $r_5 = -14.9038$ | |
| | $d_5$ variable (13.797~2.891) |

-continued $r_6 = -22.2529$ (aspherical surface)
   $d_6 = 3.3343$   $n_{03} = 1.58913$   $\nu_3 = 60.97$
$r_7 = -18.4563$
   $d_7 = 4.3562$
$r_8 = -12.6713$
   $d_8 = 1.4700$   $n_{04} = 1.74320$   $\nu_4 = 49.31$
$r_9 = -39.0611$ $n_{01}(d) = 1.60311 - 0.60275 \times 10^{-3} \cdot r^2 + 0.12240 \times 10^{-4} \cdot r^4 + 0.80291 \times 10^{-7} \cdot r^6$
$n_{01}(C) = 1.60024 - 0.61815 \times 10^{-3} \cdot r^2 + 0.12150 \times 10^{-4} \cdot r^4 + 0.79860 \times 10^{-7} \cdot r^6$
$n_{01}(F) = 1.61017 - 0.56486 \times 10^{-3} \cdot r^2 + 0.12461 \times 10^{-4} \cdot r^4 + 0.81349 \times 10^{-7} \cdot r^6$
$n_{02}(d) = 1.60311 - 0.39733 \times 10^{-3} \cdot r^2 - 0.11177 \times 10^{-5} \cdot r^4 + 0.27819 \times 10^{-7} \cdot r^6$
$n_{02}(C) = 1.60008 - 0.39061 \times 10^{-3} \cdot r^2 - 0.12386 \times 10^{-5} \cdot r^4 + 0.27666 \times 10^{-7} \cdot r^6$
$n_{02}(F) = 1.61002 - 0.41265 \times 10^{-3} \cdot r^2 - 0.84199 \times 10^{-6} \cdot r^4 + 0.28168 \times 10^{-7} \cdot r^6$ aspherical surface cofficients
$E = 0.32382 \times 10^{-4}$, $F = 0.23966 \times 10^{-6}$
$G = 0.81673 \times 10^{-9}$, $H = -0.11821 \times 10^{-11}$ wherein the reference symbols $r_1$ through $r_{11}$ represent radii of curvature on the surfaces of the respective lens components, the reference symbols $d_1$ through $d_{10}$ designates thicknesses of the respective lens components and airspaces reserved therebetween, the reference symbols $n_{01}$ through $n_{05}$ denote refractive indices of the respective lens components (refractive indices at the center in case of graded refractive index lens components), the reference symbols $\nu_1$ through $\nu_5$ represent Abbe's numbers of the respective lens components, the reference symbols $f_{BW}$ designates back focal length at the wide position and the reference symbol $P_W$ denotes telephoto ratio at the wide position.

Out of these embodiments, each of the zoom lens systems described as the Embodiments 1 through 17 comprises, in the order from the object side, a first convex meniscus lens component having a convex surface on the object side, a second concave lens component, a third convex lens component, a fourth convex lens component and a fifth concave meniscus lens component having a concave surface on the object side.

Figure 2:
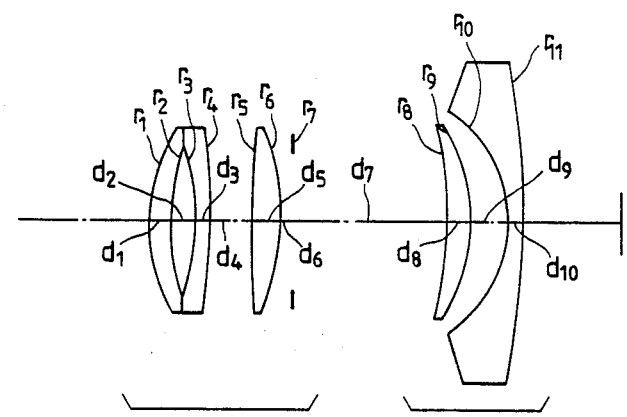
Figure 2:
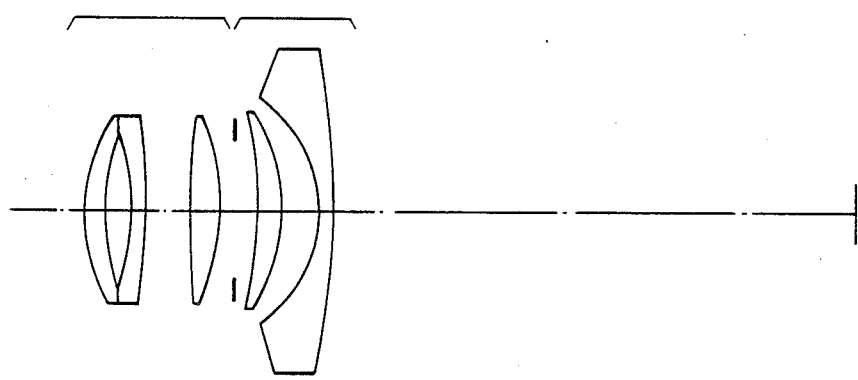
Figure 3:
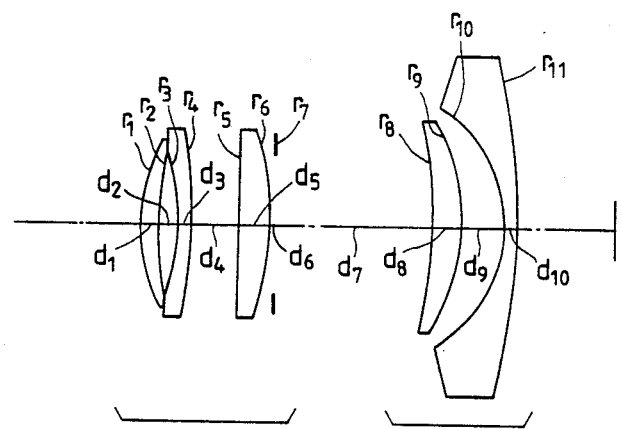
Figure 3:
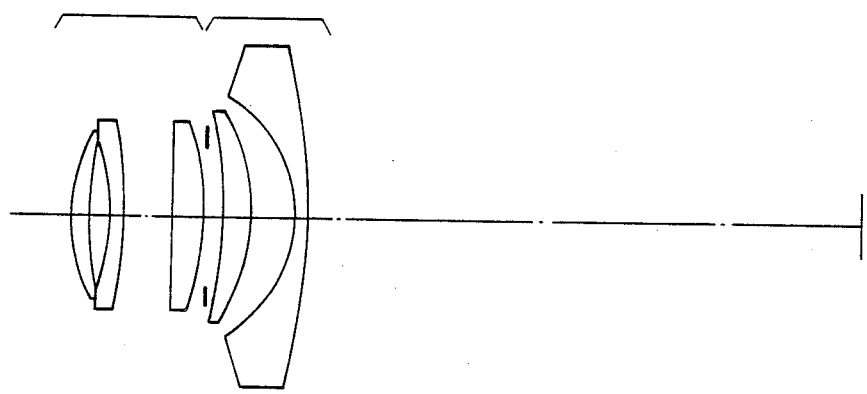
Figure 4:
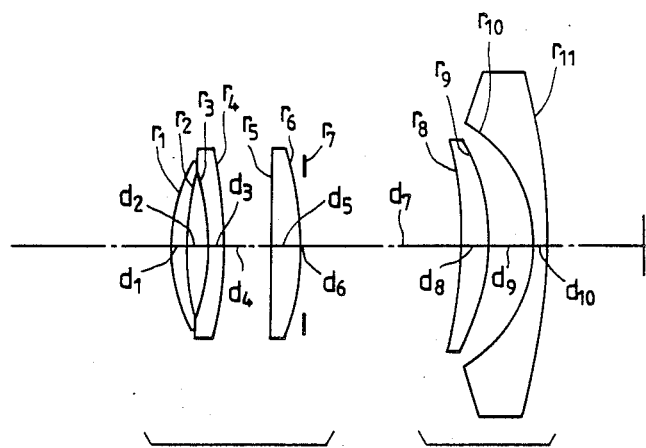
Figure 4:
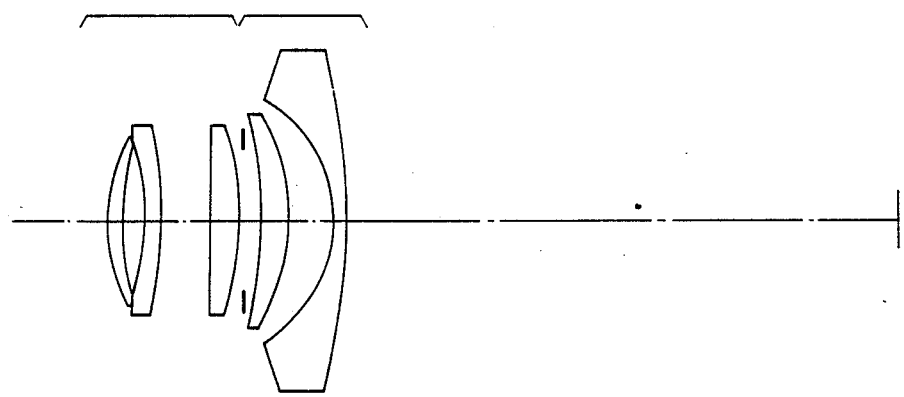
Figure 5:
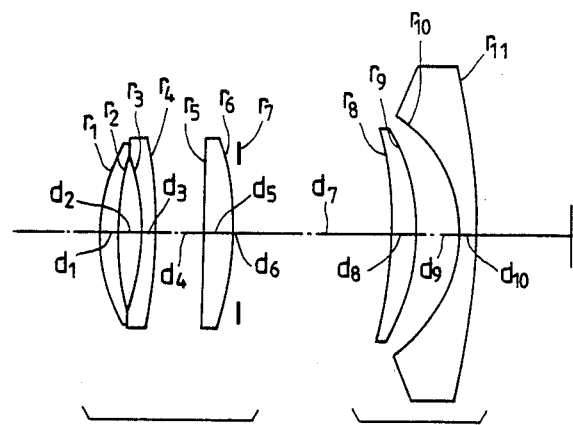
Figure 5:
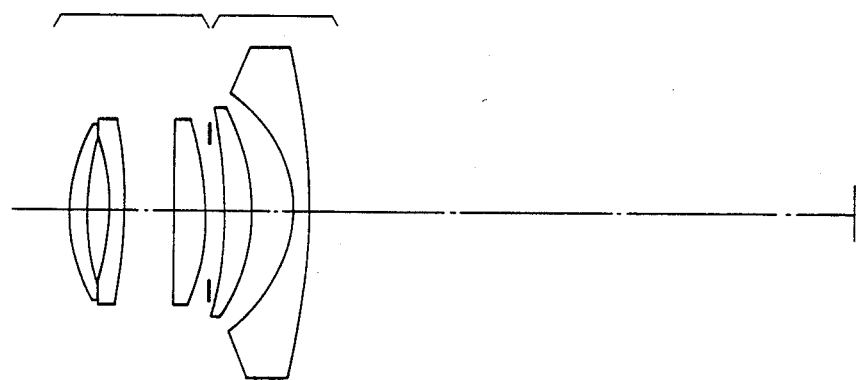
Figure 6:
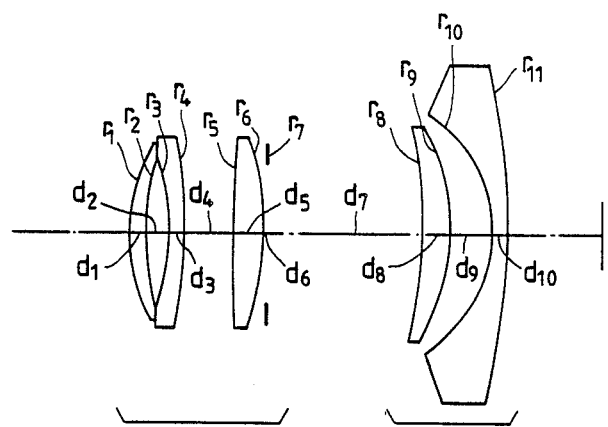
Figure 6:
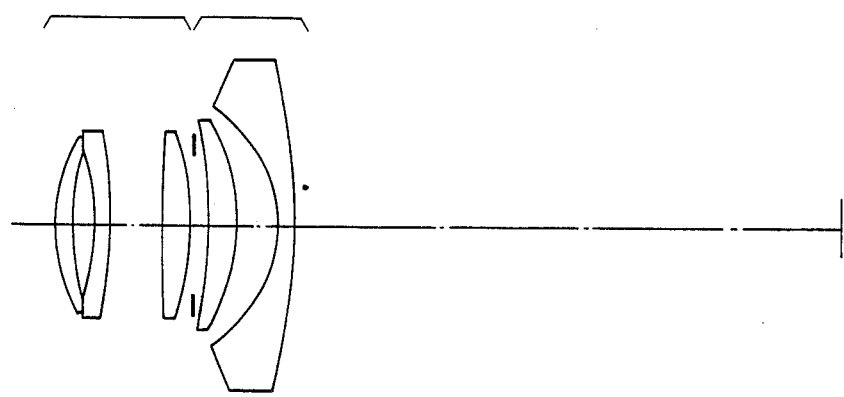
Figure 7:
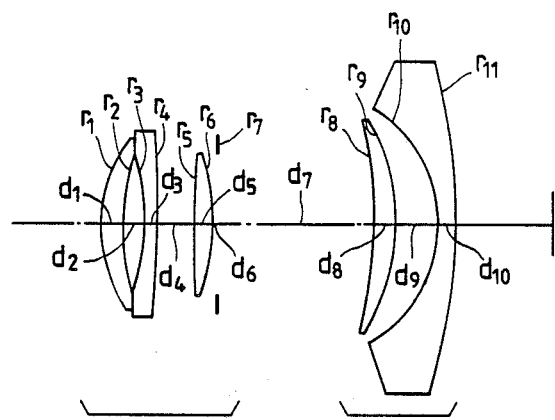
Figure 7:
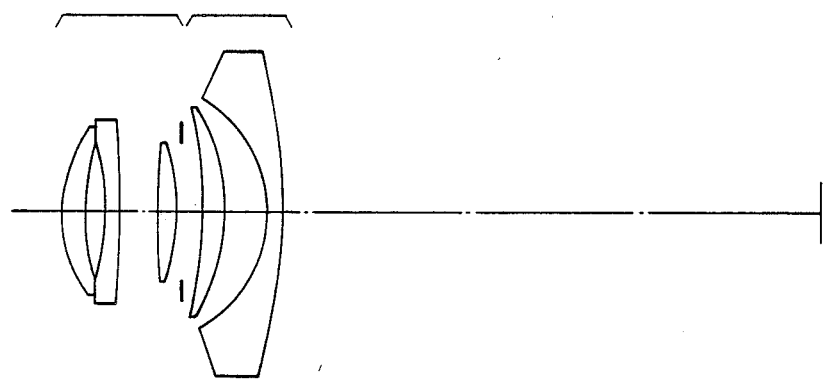

Out of these embodiments, the Embodiments 1 through 3 have the compositions illustrated in FIG. 1 through FIG. 3 respectively wherein each zoom lens system comprises a first lens group consisting of the first through third lens components and having positive refractive power as a whole, and a second lens group consisting of the fourth and fifth lens components, and having negative refractive power as a whole. At least the fourth positive lens component arranged in the second lens group is designed as a graded refractive index lens component made of a medium having negative refractive power. By this design, the negative refractive power of the second lens group is shared not only with the fifth lens component but also with the medium of the fourth lens component. Accordingly, it is possible to enlarge radii of curvature on the surfaces of the fifth lens component and reduce the distortion produced by the second lens group.

Each of the Embodiments 1 through 3 uses three graded refractive index lens components. The fourth lens component is designed as the graded refractive index lens commonly in the Embodiments 1 through 3, whereas the other graded refractive index lens components are used differently in the Embodiments 1 through 3.

In each of the Embodiments 1 and 3, the second lens component is designed as a graded refractive index lens component. This design serves for correcting the coma, which is apt to be produced remarkably by the second lens component, by utilizing the refractive index distribution formed on the surface of this lens component.

In each of the Embodiment 2 and 3, the third lens component is designed as a graded refractive index lens component made of a medium having positive refractive power. This design serves for sharing the positive refractive power of the first lens group with the third lens component, thereby making it possible to enlarge the radius of curvature $r_6$ on the image side surface of the third lens component, which otherwise produces especially spherical aberration remarkably, so as to correct spherical aberration in the entire range from the wide position to the tele position.

Figure 20:
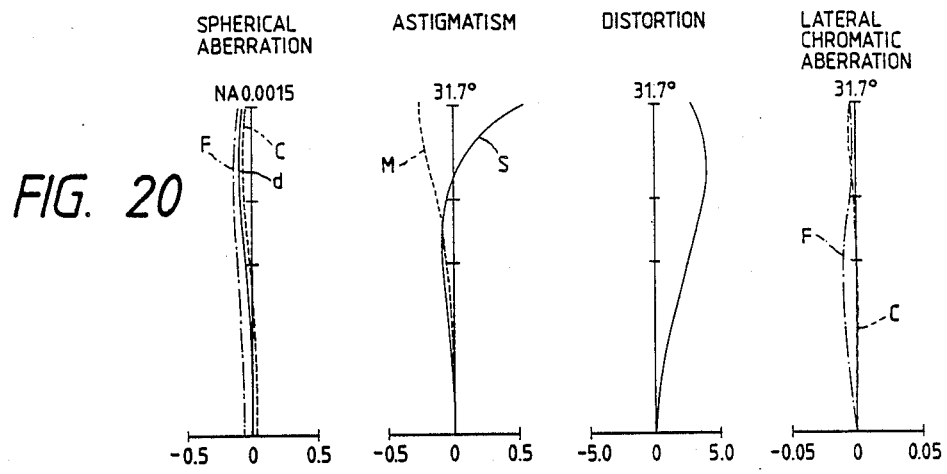
FIG. 20 through FIG. 22 show curves illustrating aberration characteristics of the Embodiment 1.
Figure 21:
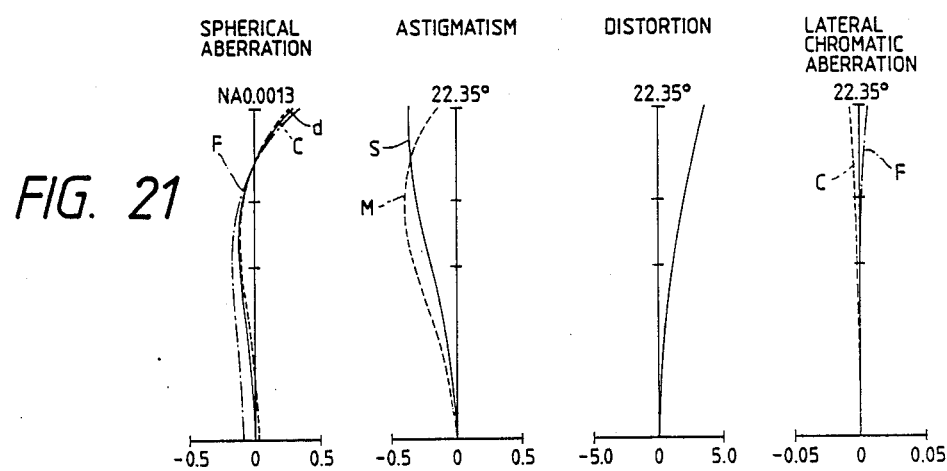
Figure 22:
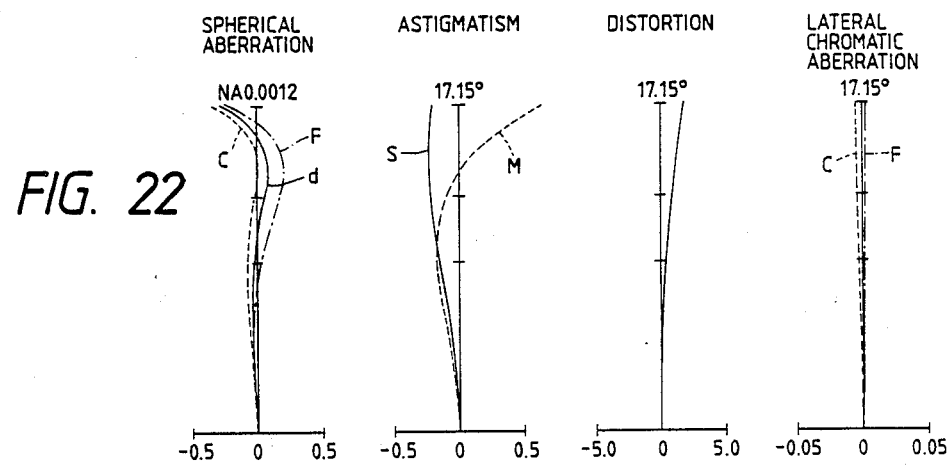
Figure 23:
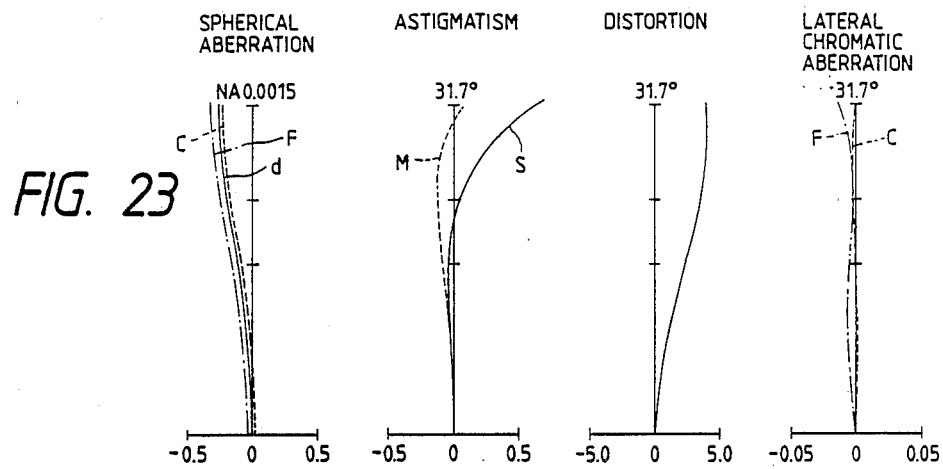
FIG. 23 through FIG. 25 show curves illustrating aberration characteristics of the Embodiment 2.
Figure 24:
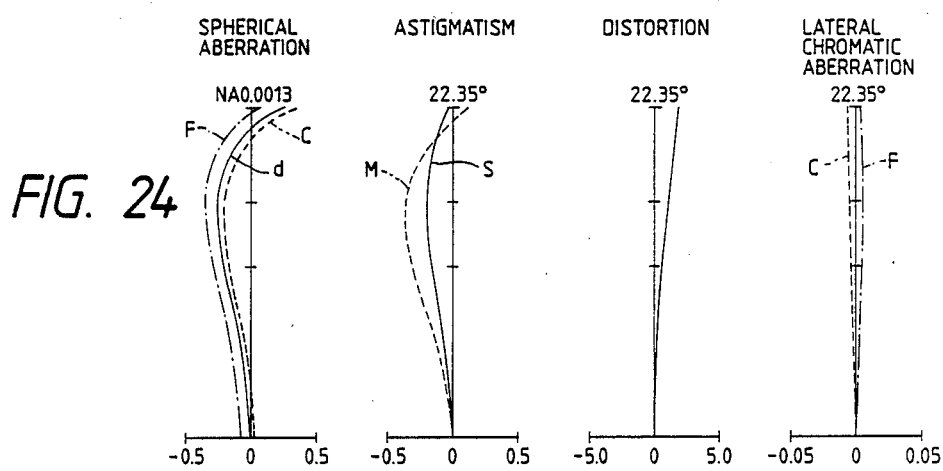
Figure 25:
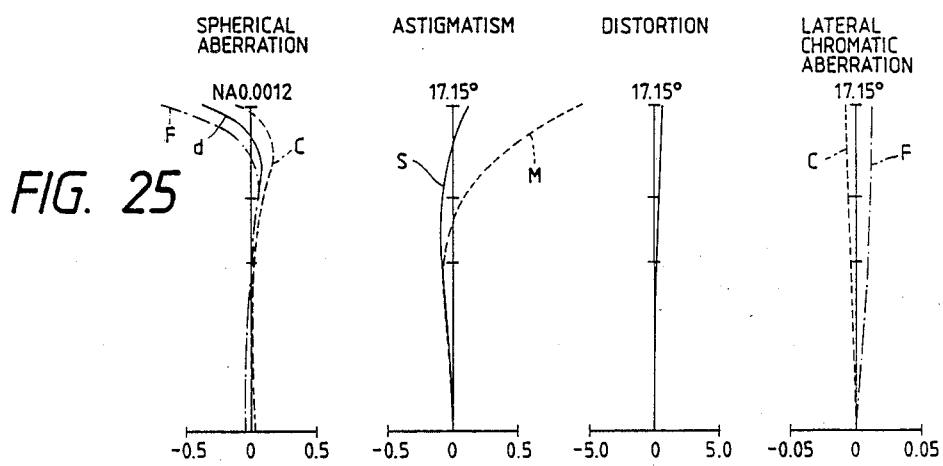
Figure 26:
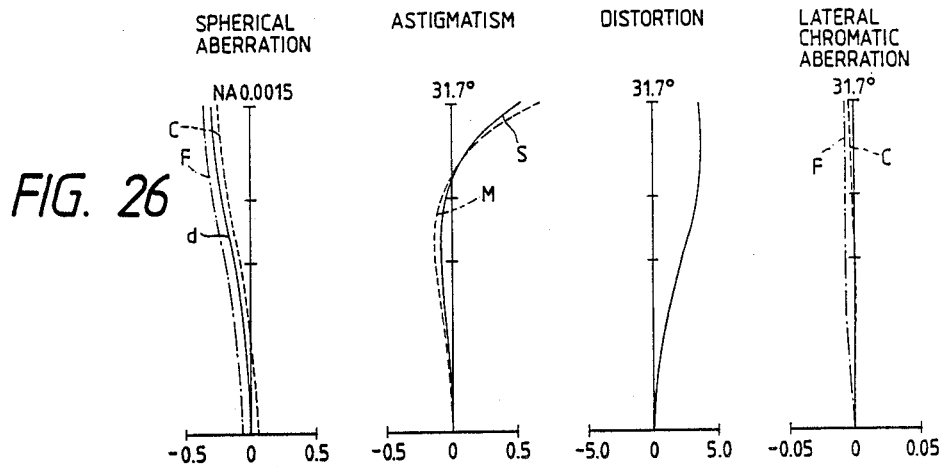
FIG. 26 through FIG. 28 show curves illustrating aberration characteristics of the Embodiment 3.
Figure 27:
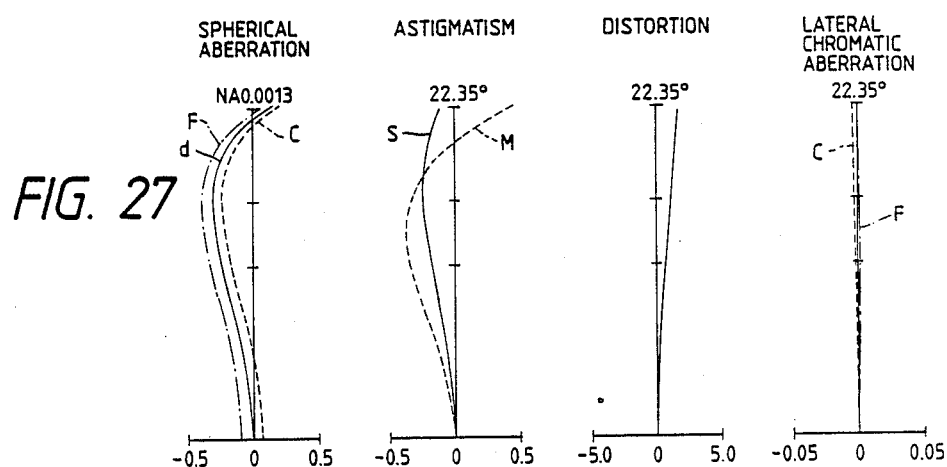
Figure 28:
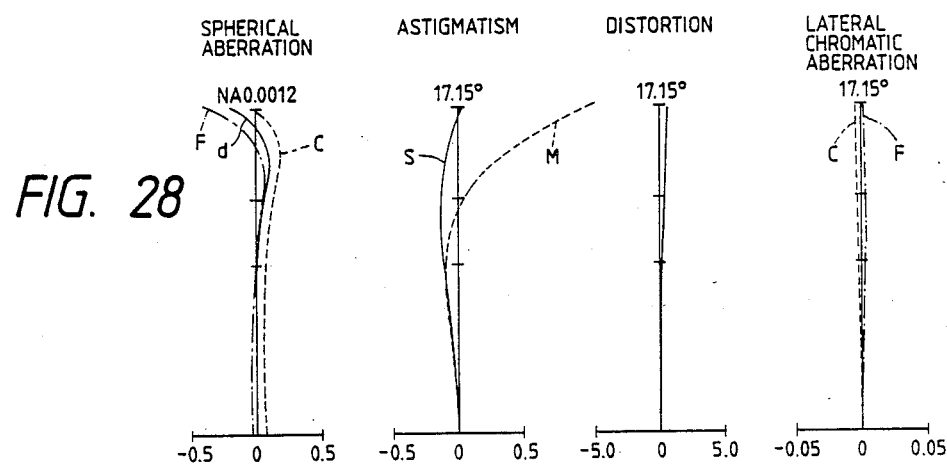

When the fifth lens component is designed as a graded refractive index lens component made of a medium having negative refractive power as in the case of the Embodiments 1 or 2, the design is effective to correct positive distortion and, since the offaxial ray passing through the fifth lens component is high, also effective to correct offaxial aberrations. Aberration characteristics at the wide position, intermediate focal length and tele position of the Embodiment 1 are illustrated in FIG. 20, FIG. 21 and FIG. 22 respectively, aberration characteristics at the wide position, intermediate focal length and tele position of the Embodiment 2 are shown in FIG. 23, FIG. 24 and FIG. 25 respectively, and aberration characteristics at the wide position, intermediate focal length and tele position of the Embodiment 3 are visualized in FIG. 26, FIG. 27 and FIG. 28 respectively.

Each of the zoom lens systems described above as the Embodiments 1, 2 and 3 has the above-described composition, a zooming ratio of 2, five lens components and, nevertheless, favorably corrected aberrations. In addition, each of these embodiments is a compact zoom lens system having a telephoto ratio of 1.14 at the wide position.

The Embodiments 4 through 7 have the compositions illustrated in FIG. 4 through FIG. 7 respectively wherein the second, third and fourth lens components are designed as graded refractive index lens components in the same manner as in the Embodiment 3. Further, each of the Embodiments 4 through 7 adopts an aspherical surface for correcting aberrations more favorably. Spherical aberration and offaxial aberration are corrected by adopting the aspherical surface as a lens surface which is located near the object side and at which the marginal ray and offaxial ray are high, or offaxial aberration is corrected favorably by adopting the aspherical surface as a lens surface located near the image side at which the offaxial ray is high.

When the direction of the optical axis is taken as the x axis, the shapes of the aspherical surfaces used in these embodiments are expressed by the following formula:

$$x = \frac{CS^2}{1 + \sqrt{1 - C^2S^2}} + ES^4 + FS^6 + GS^8$$

wherein $S^2 = y^2 + Z^2$, $C = 1/r$ (r represents radius of curvature at the vertex), and the reference symbols E, F and G designate coefficients of aspherical surface.

Out of these embodiments, the Embodiment 7 has a very small telephoto ratio, i.e., 109 at the wide position.

Figure 29:
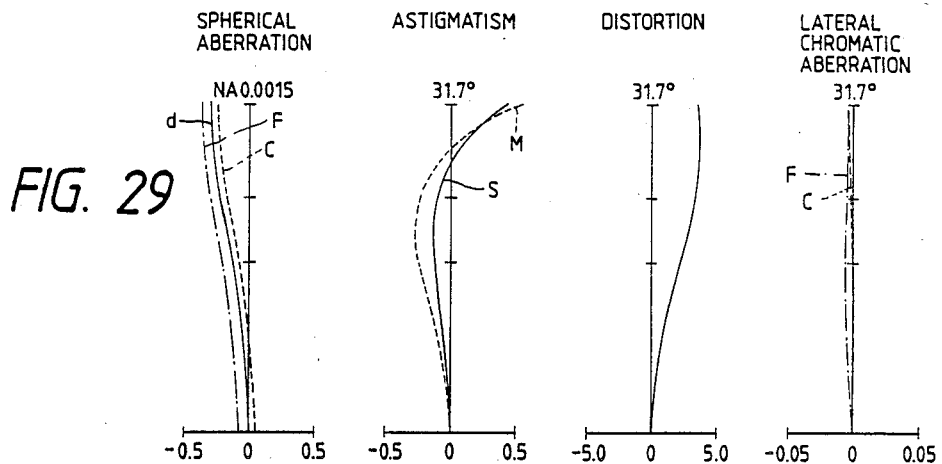
FIG. 29 through FIG. 31 show curves illustrating aberration characteristics of the Embodiment 4.
Figure 30:
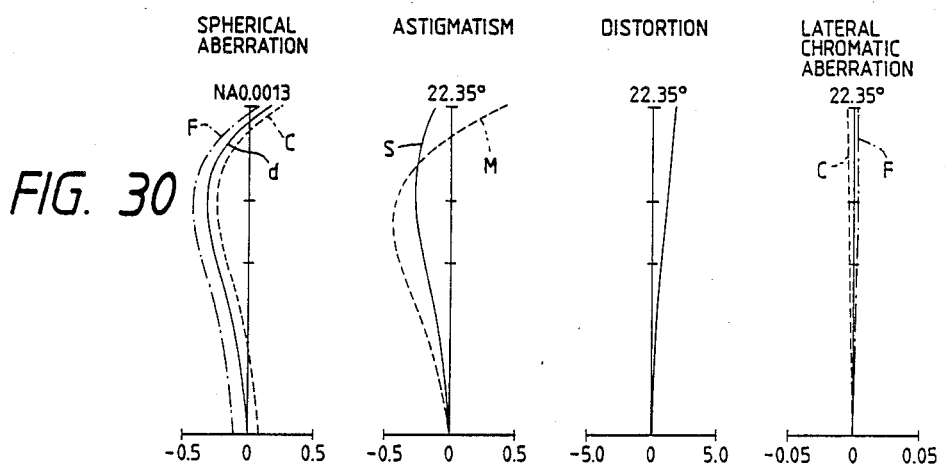
Figure 31:
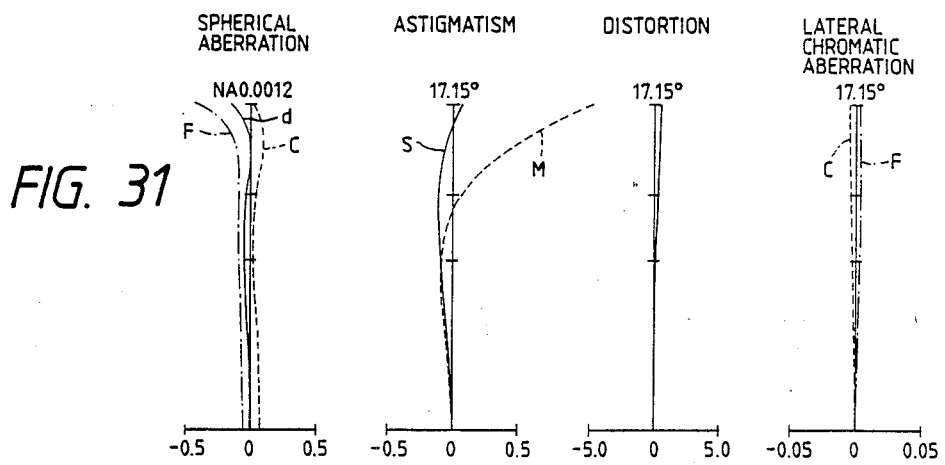

Aberration characteristics at the wide position, intermediate focal length and tele position of the Embodiment 4 are illustrated in FIG. 29, FIG. 30 and FIG. 31 respectively.

Figure 32:
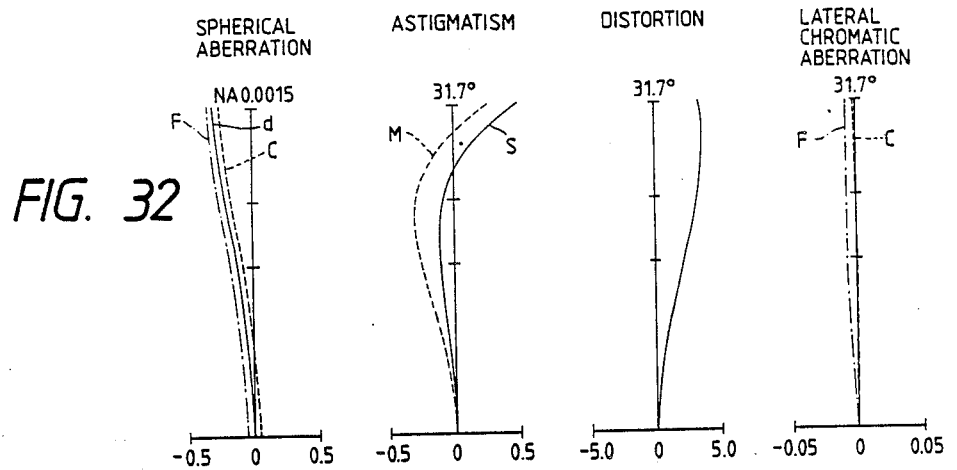
FIG. 32 through FIG. 34 show curves illustrating aberration characteristics of the Embodiment 5.
Figure 33:
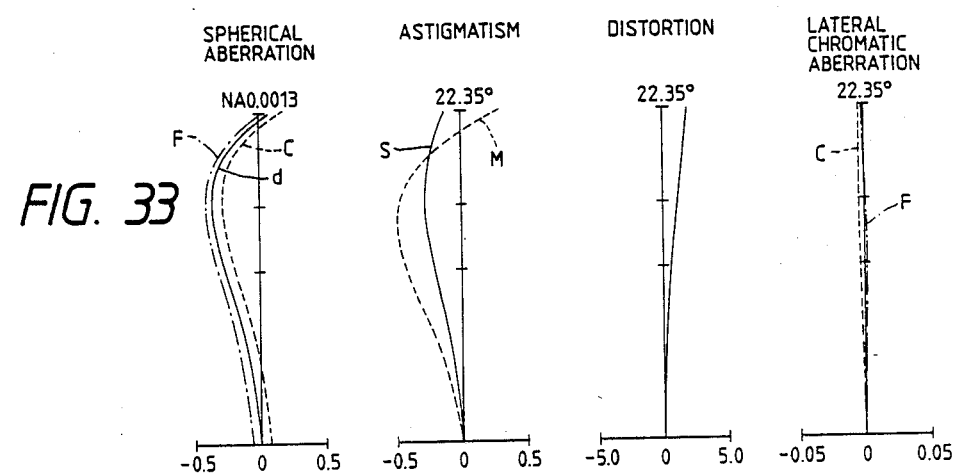
Figure 34:
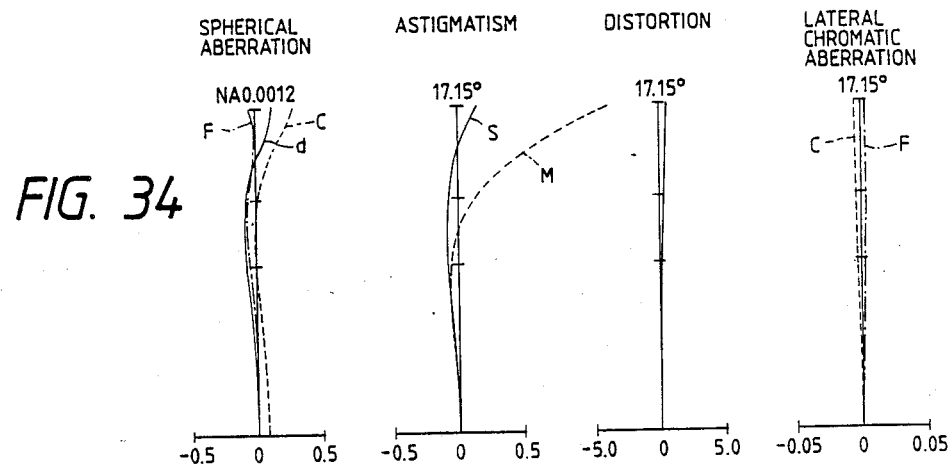

Aberration characteristics at the wide position, intermediate focal length and tele position of the Embodiment 5 are illustrated in FIG. 32, FIG. 33 and FIG. 34 respectively.

Figure 35:
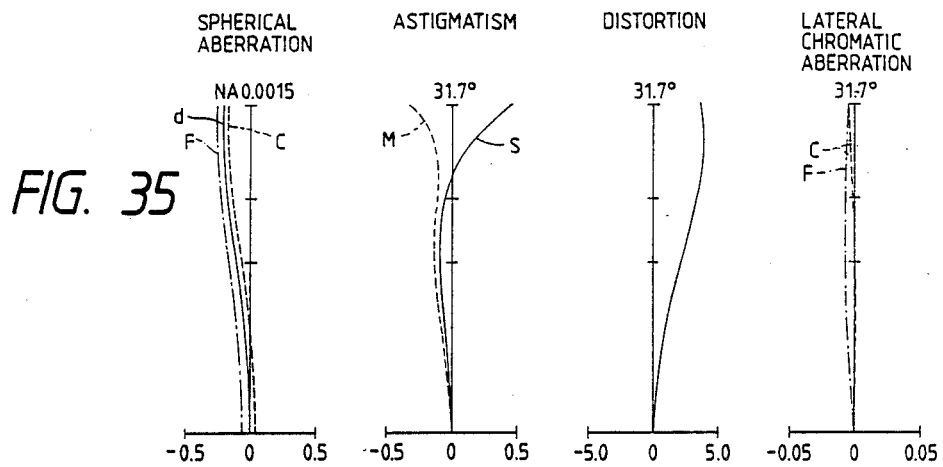
FIG. 35 through FIG. 37 show graphs illustrating aberration characteristics of the Embodiment 6.
Figure 36:
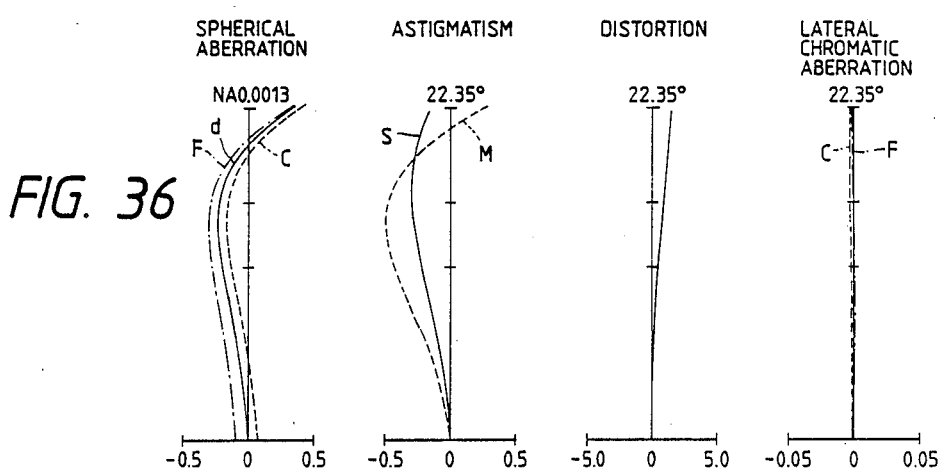
Figure 37:
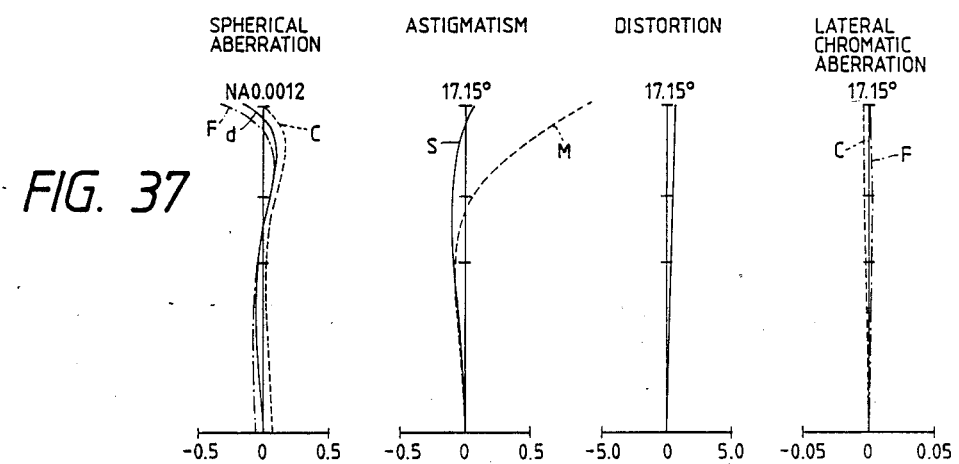

Aberration characteristics at the wide position, intermediate focal length and tele position of the Embodiment 6 are visualized in FIG. 35, FIG. 36 and FIG. 37 respectively.

Figure 38:
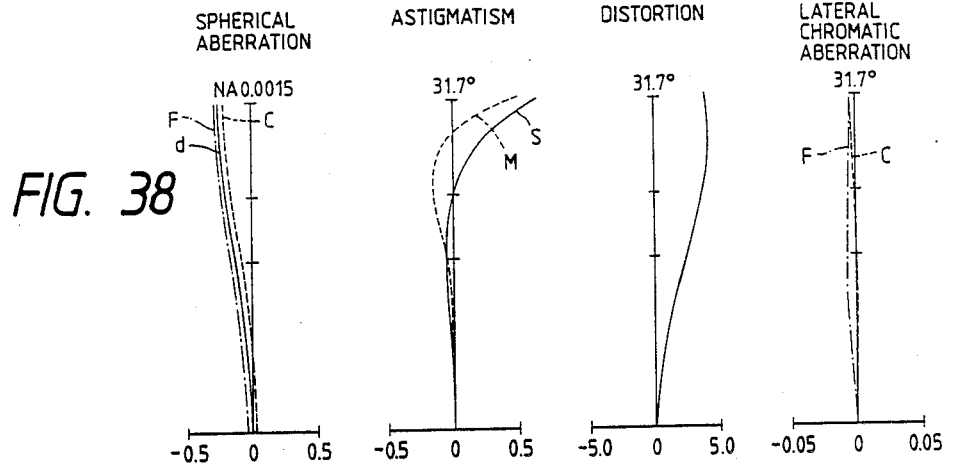
FIG. 38 through FIG. 40 show graphs illustrating aberration characteristics of the Embodiment 7.
Figure 39:
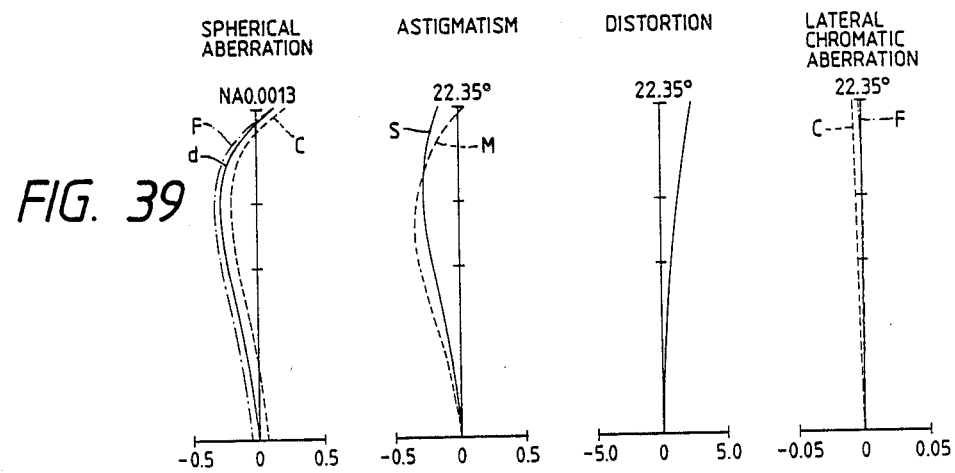
Figure 40:
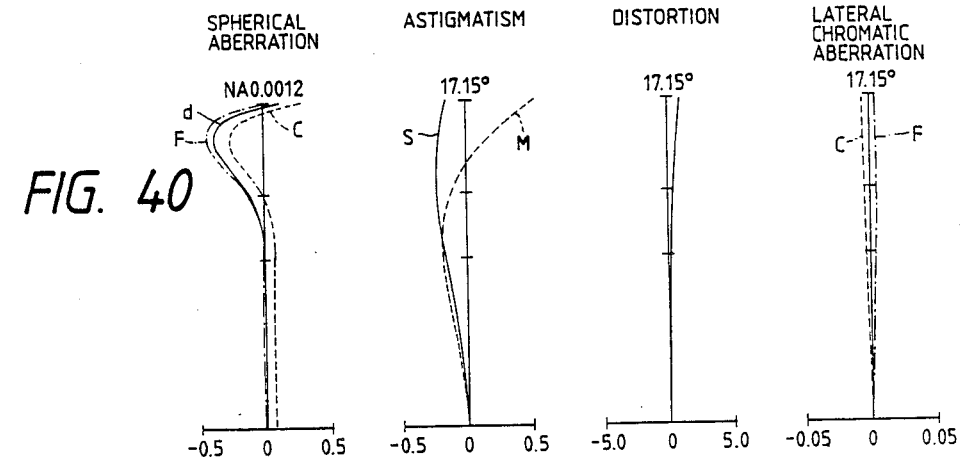

Aberration characteristics at the wide position, intermediate focal length and tele position of the Embodiment 7 are shown in FIG. 38, FIG. 39 and FIG. 40 respectively.

Figure 8:
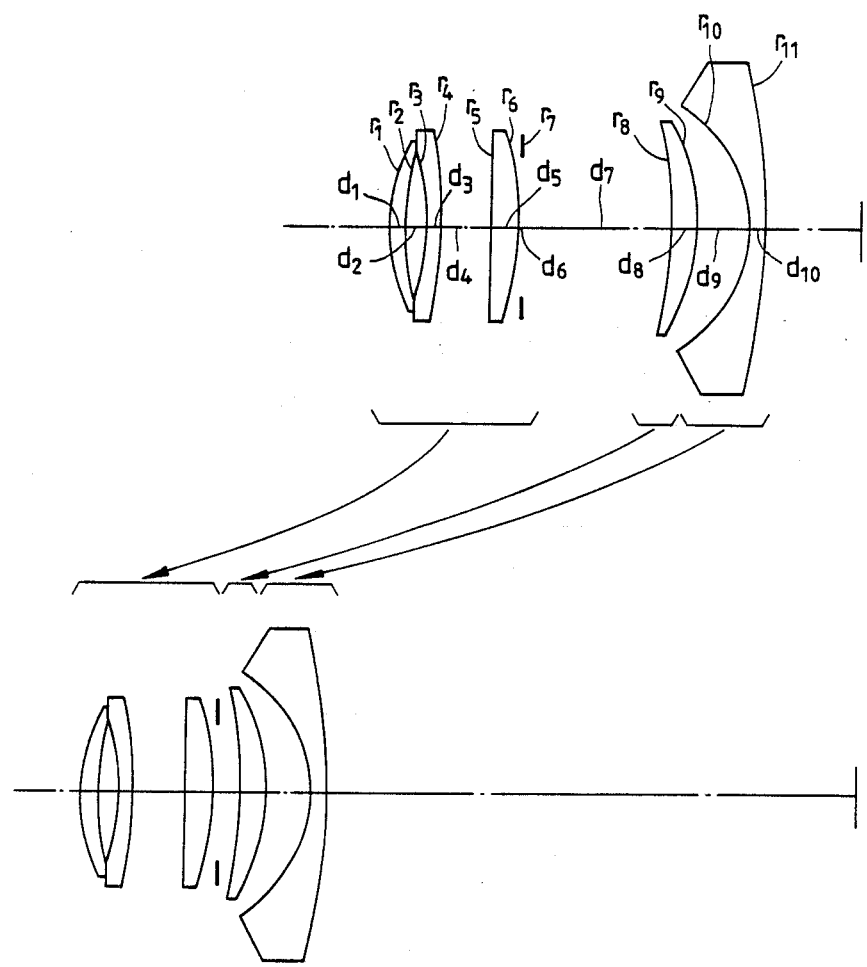
Figure 9:
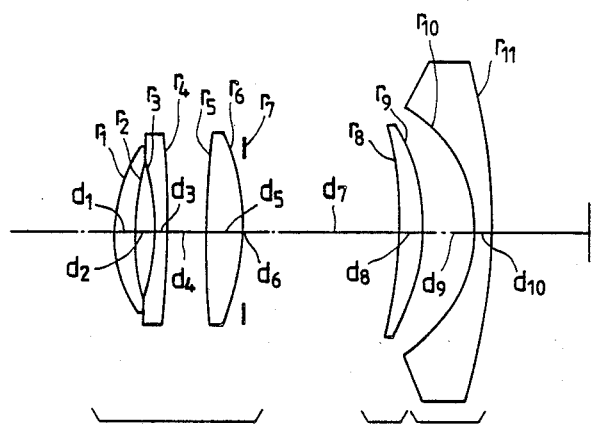
Figure 9:
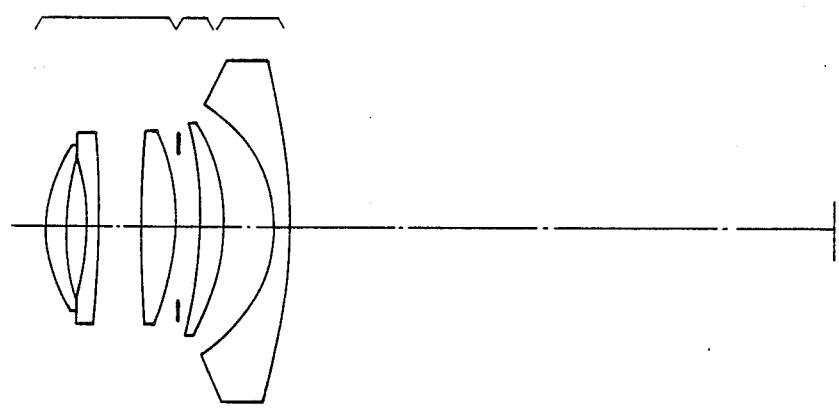
Figure 10:
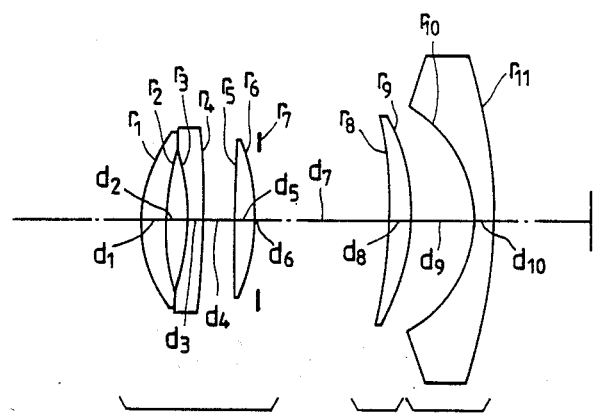
Figure 10:
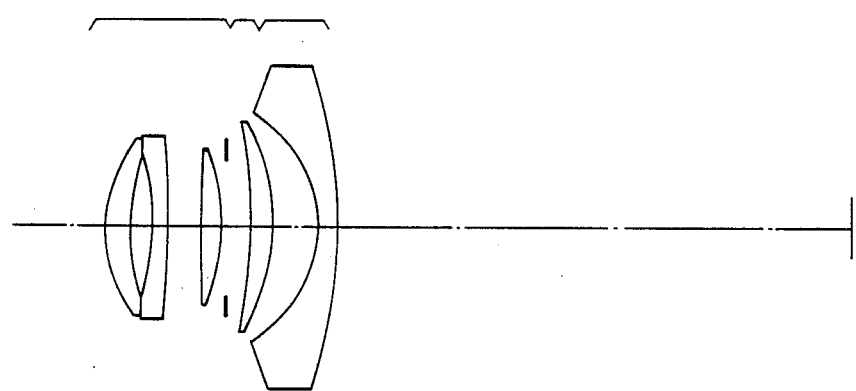
Figure 11:
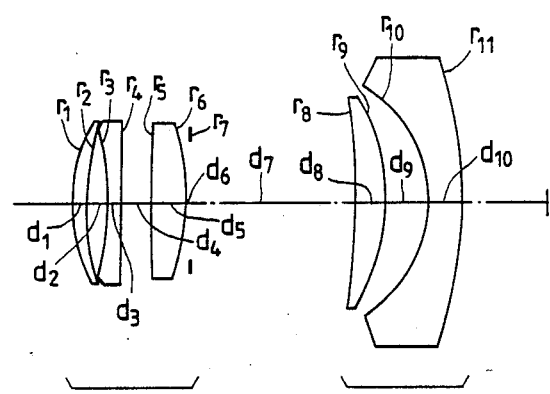
Figure 11:
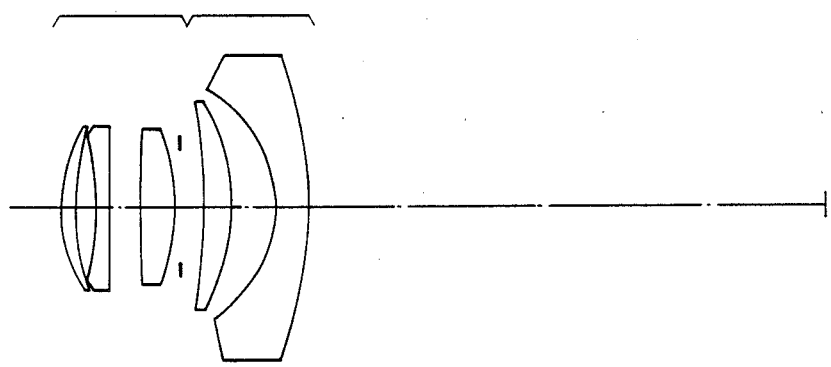
Figure 12:
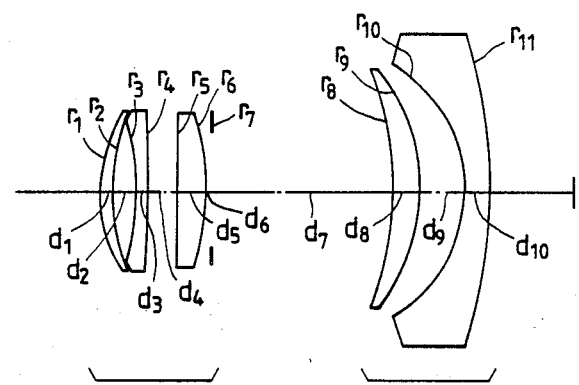
Figure 12:
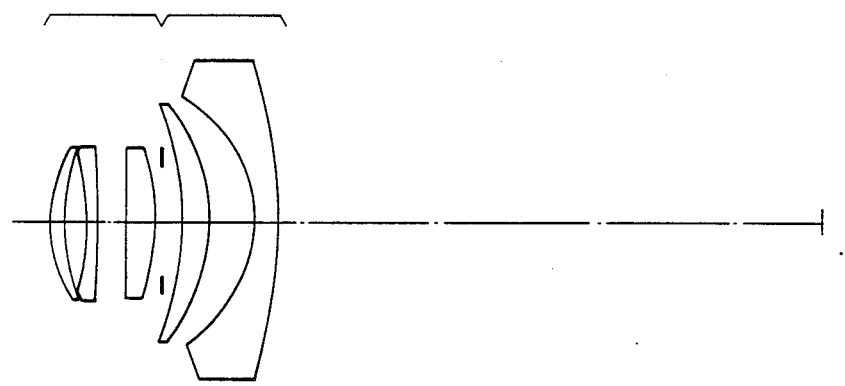
Figure 13:
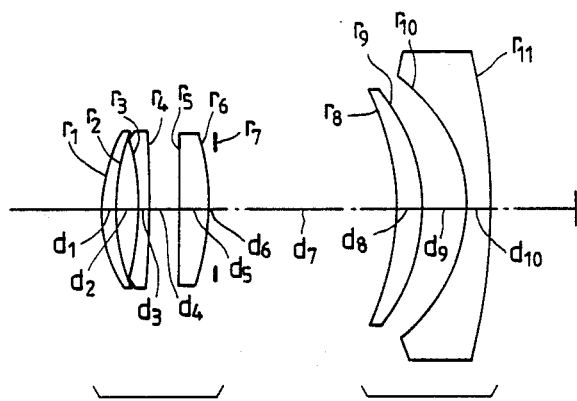
Figure 13:
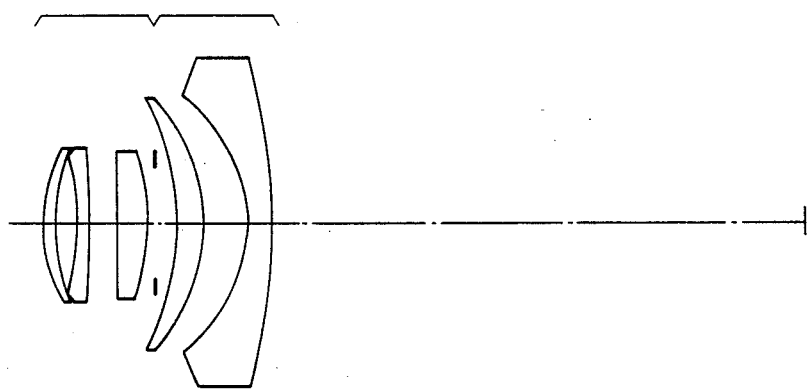
Figure 14:
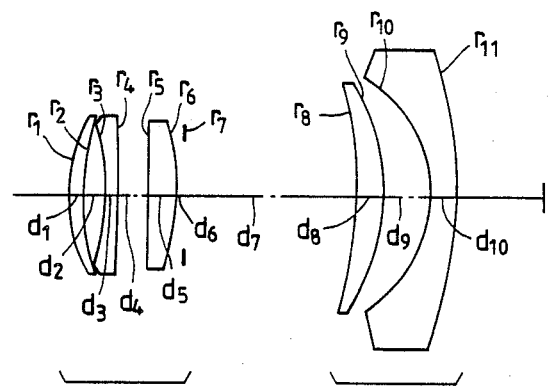
Figure 14:
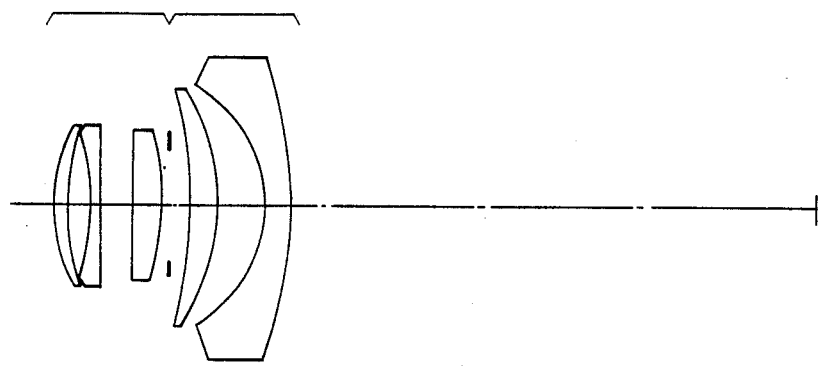
Figure 15:
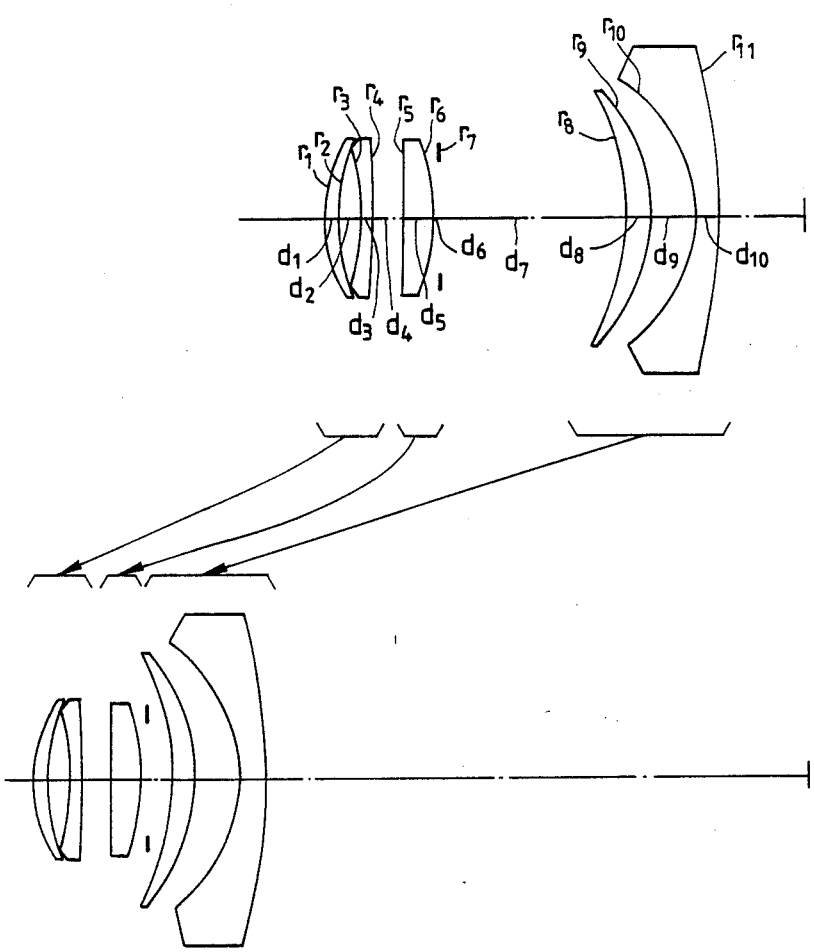
Figure 16:
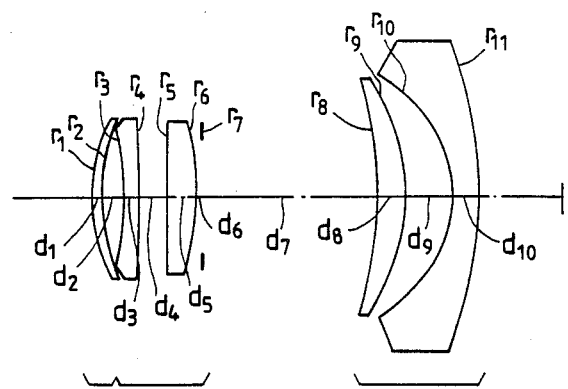
Figure 16:
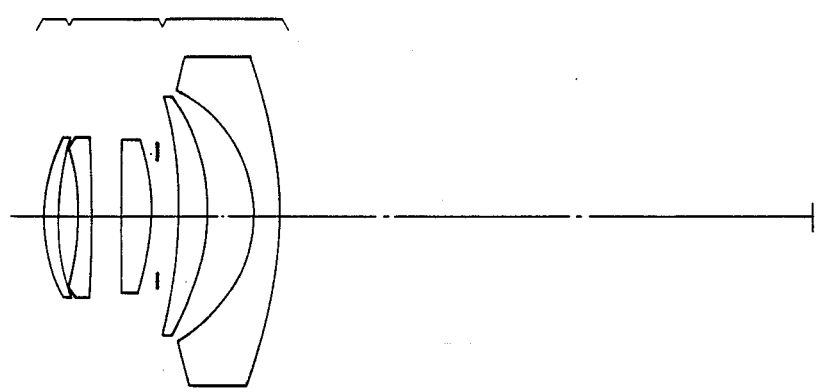
Figure 17:
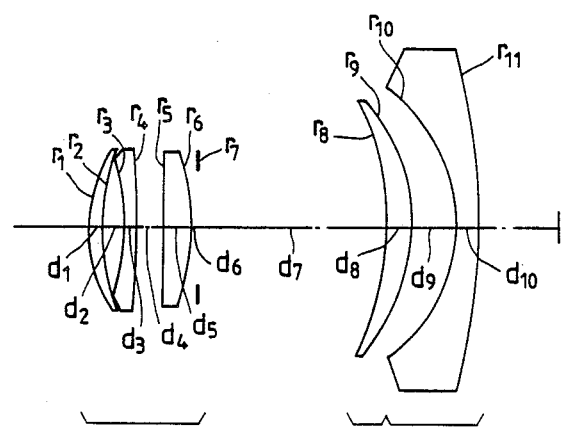
Figure 17:
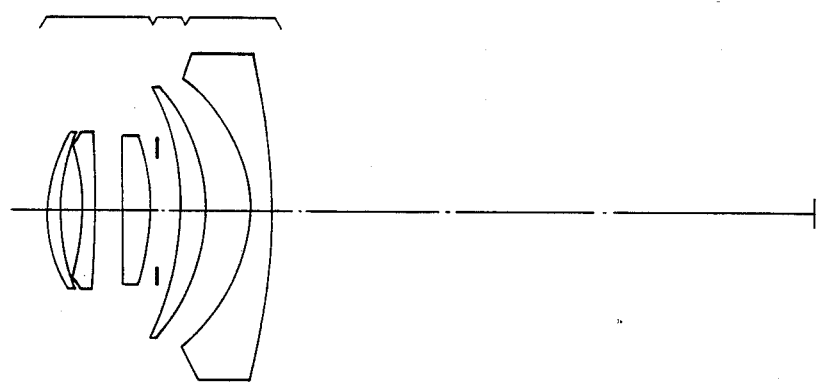

The Embodiments 8 through 10 of the present invention have the compositions illustrated in FIGS. 8 through 10 respectively wherein the second lens group is divided into two subunits and the lens group is shifted for zooming while slightly varying the airspace reserved between these two subgroups.

Each of the Embodiments 8 through 10 comprises a first lens group consisting of a first through third lens components and having positive refractive power as a whole, a first positive subunit consisting of a fourth lens component and a second negative subgroup consisting of a fifth lens component. Each of the Embodiments 8 through 10 increases flexibility for correcting aberrations and corrects spherical aberrations of higher orders produced especially at the tele position by varying the airspace reserved between the first subunit (the fourth lens component) and the second subunit (the fifth lens component) during zooming operation. The Embodiment 8 uses graded refractive index lens components as the second, third and fourth lens components, thereby having the same effect as that obtained by the Embodiment 3. Further, the Embodiment 8, in which the second lens group is divided into the two subunit and the airspace reserved between these two subgroups is slightly aried, corrects favorably the spherical aberrations of higher orders which are produced at the tele position and cannot be corrected sufficiently in the Embodiment 3.

Figure 41:
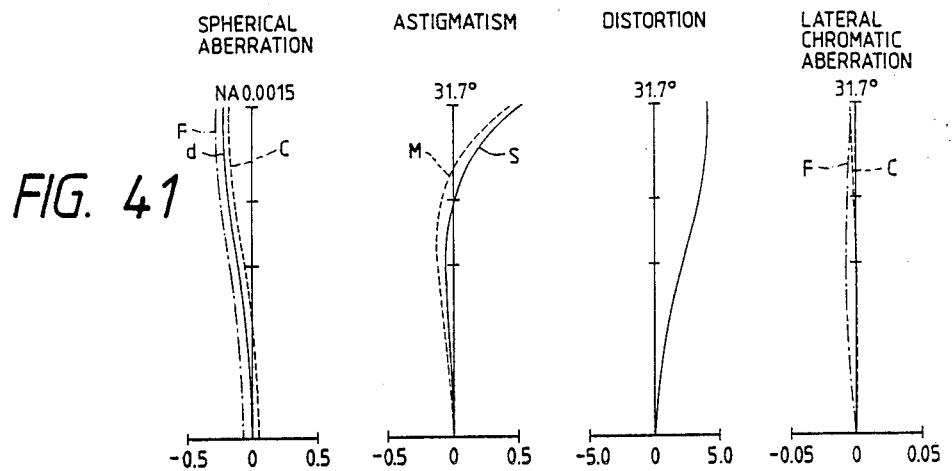
FIG. 41 through FIG. 43 show graphs illustrating aberration characteristics of the Embodiment 8.
Figure 42:
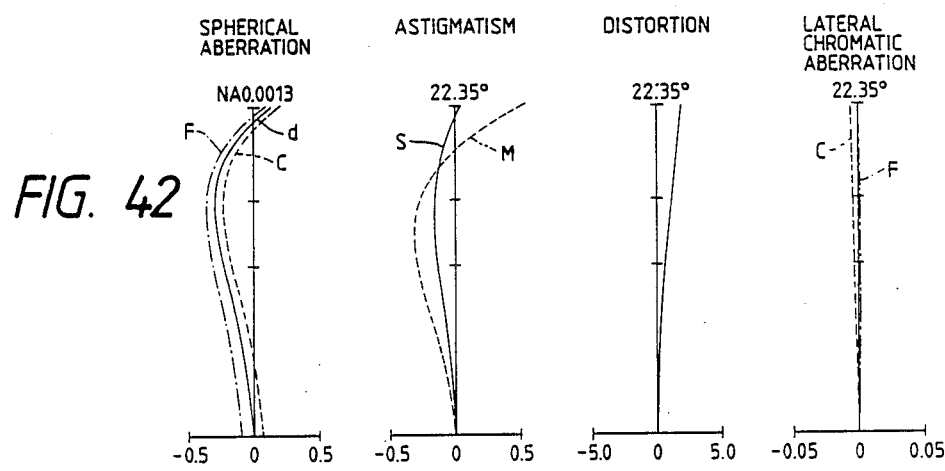
Figure 43:
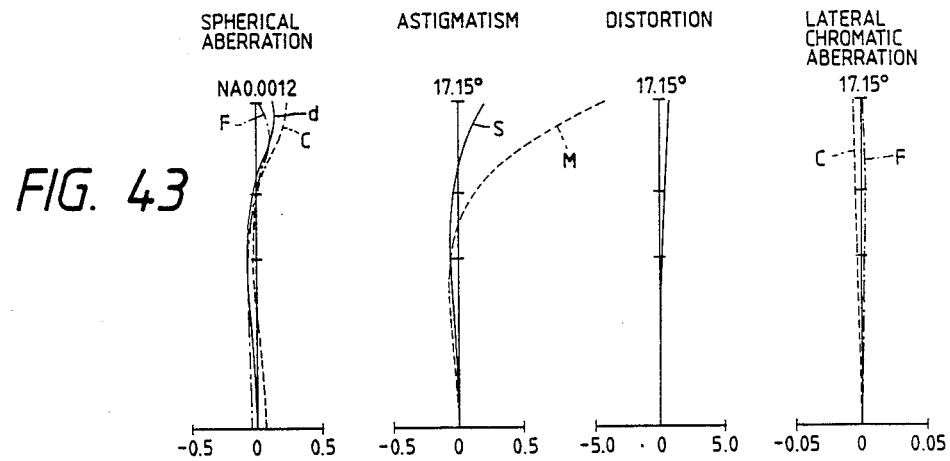

Aberration characteristics at the wide position, intermediate focal length and tele position of the Embodiment 8 are shown in FIG. 41, FIG. 42 and FIG. 43 respectively.

Figure 44:
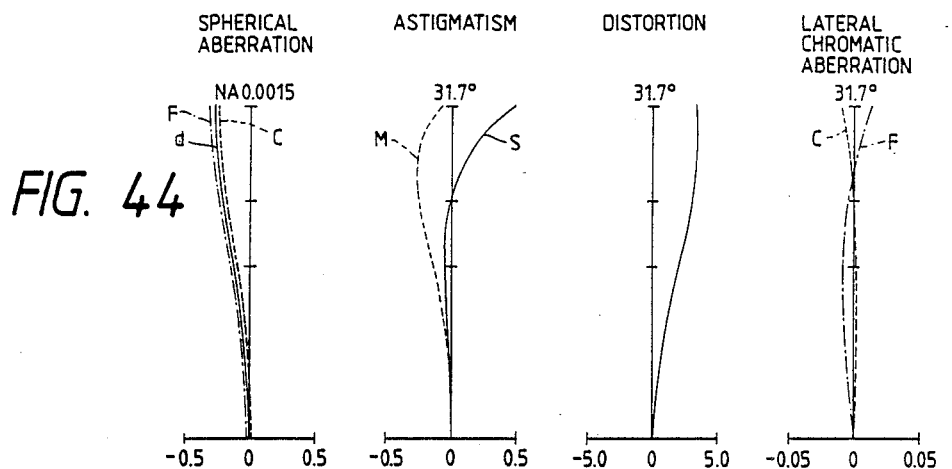
FIG. 44 through FIG. 46 show graphs illustrating aberration characteristics of the Embodiment 9.
Figure 45:
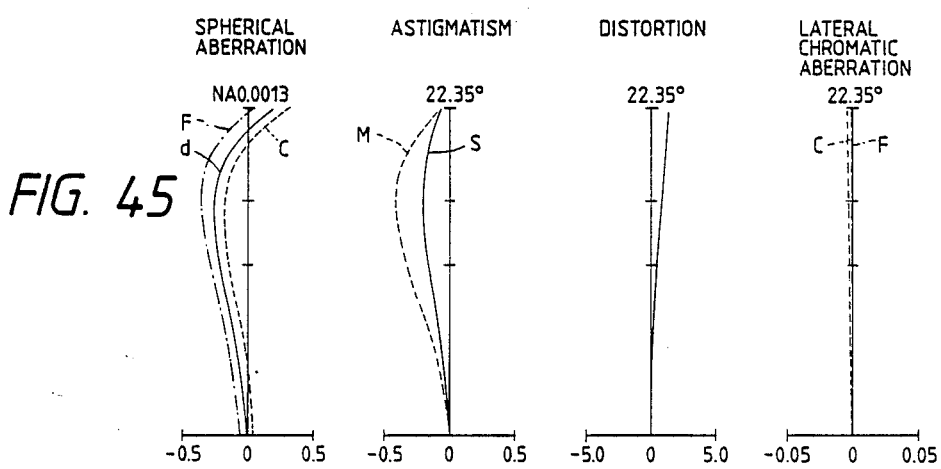
Figure 46:
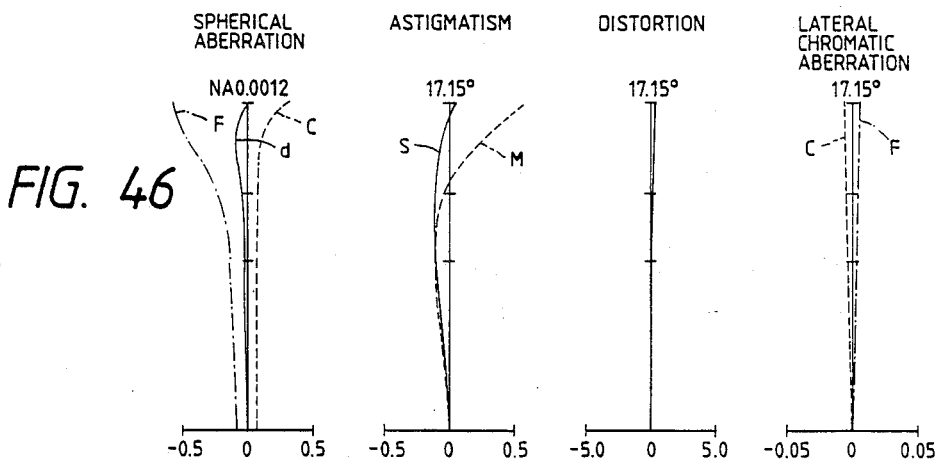

The Embodiment 9 adopts an aspherical surface, thereby reducing the number of the graded refractive index lens components to two, i.e., the third and fourth lens components, without aggravating aberrations. This embodiment is characterized in that the airspace reserved between the first subunit (the fourth lens component) and the second subunit (the fifth lens component) is first narrowed and then widened during variation of focal length from the wide position to the tele position. Aberration characteristics at the wide position, intermediate focal length and tele position of the Embodiment 9 are illustrated in FIG. 44, FIG. 45 and FIG. 46 respectively.

Figure 47:
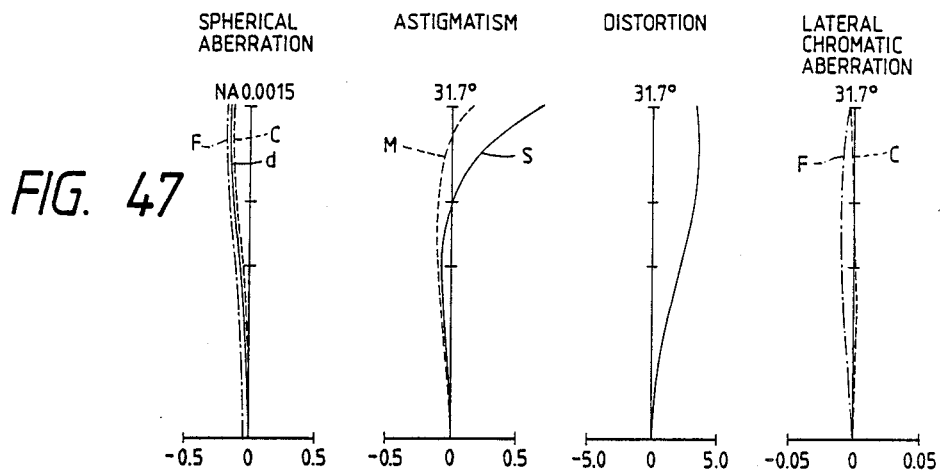
FIG. 47 through FIG. 49 show curves illustrating aberration characteristics of the Embodiment 10.
Figure 48:
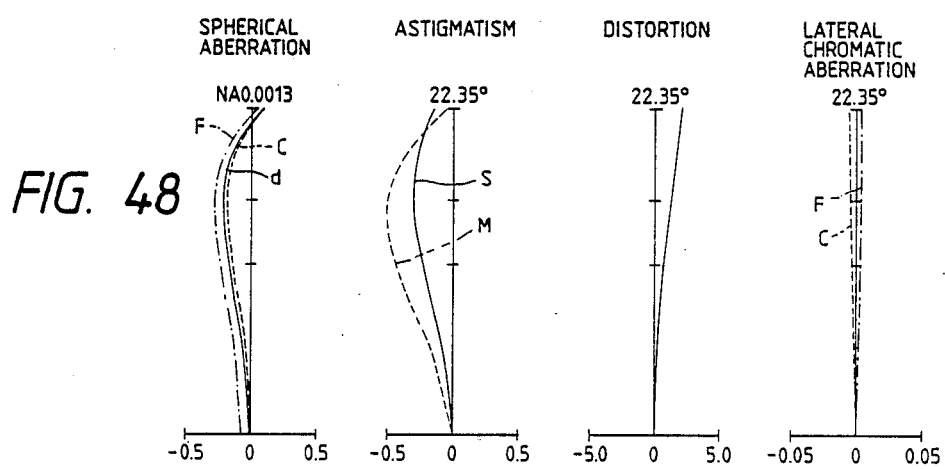
Figure 49:
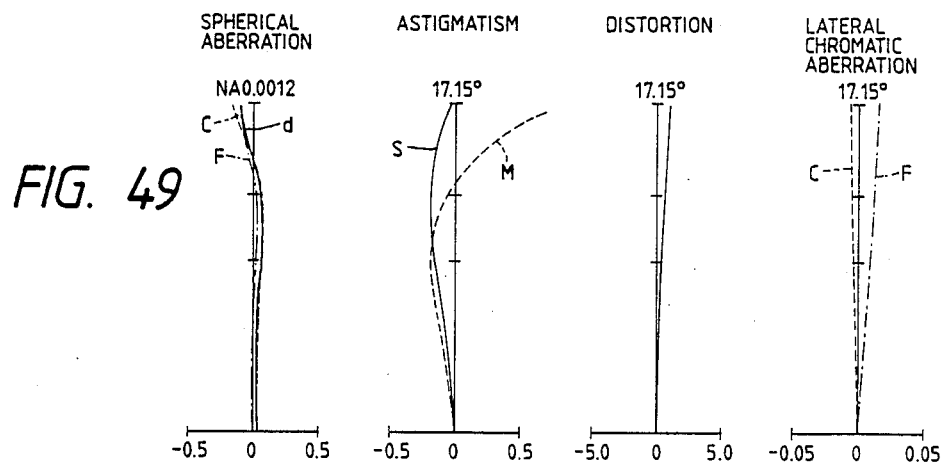

The Embodiment 10 uses three graded refractive index lens components, like the Embodiment 7, and adopts an aspherical surface, thereby obtaining a telephoto ratio of 1.09 at the wide position. Further, the Embodiment 10 narrows the airspace reserved between the first and second lens groups as well as the airspace reserved between the first subunit (the fourth lens component) and, at the same time, the second subunit (the fifth les component) during variation of focal length from the wide position to the tele position. Accordingly, the Embodiment 10 favorably corrects the spherical aberrations of higher orders which are produced at the tele position and cannot be corrected by the Embodiment 7. Aberration characteristics at the wide position, intermediate focal length and tele position of the Embodiment 10 are illustrated in FIG. 47, FIG. 48 and FIG. 49 respectively.

Each of the Embodiments 11 through 17 comprises, as shown in FIG. 11 through FIG. 17 respectively, a first lens group consisting of a first lens component, a second lens component and a third lens component, and a second lens group consisting of a fourth lens component and a fifth lens component. In each of these embodiments, the third lens component arranged on the extreme image side in the first lens group is designed as a graded refractive index lens component and an aspherical surface is used in the second lens group.

Figure 50:
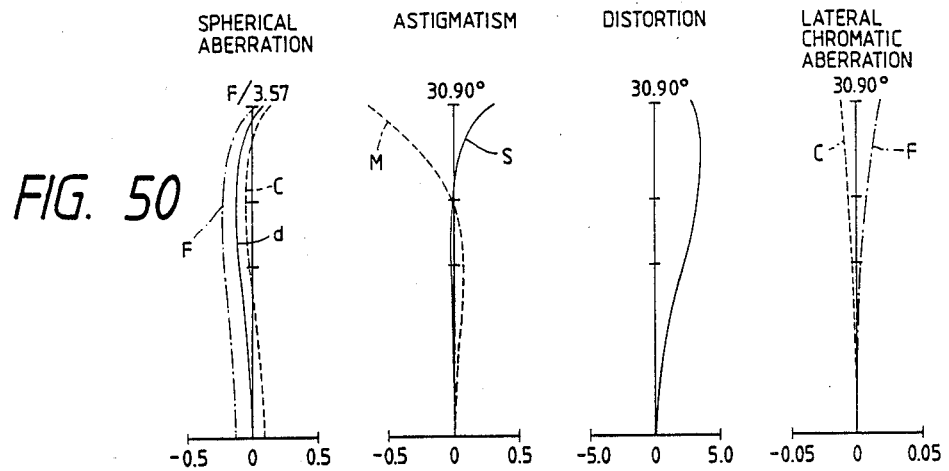
FIG. 50 through FIG. 52 show curves illustrating aberration characteristics of the Embodiment 11.
Figure 51:
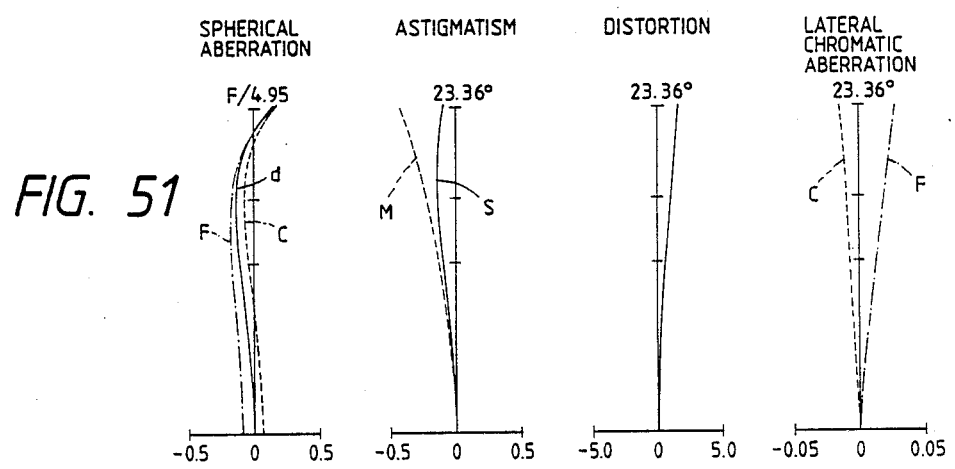
Figure 52:
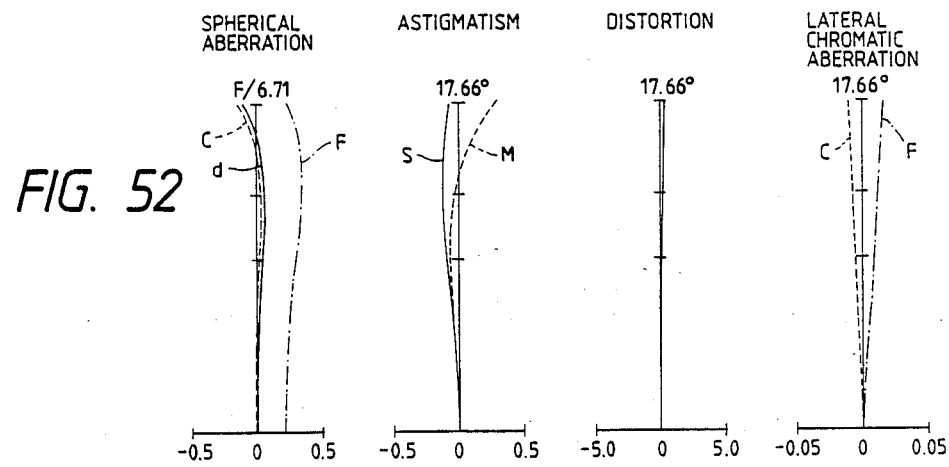

Out of these embodiments, the Embodiment 11 adopts an aspherical surface as the eighth surface ($r_8$). Aberration characteristics at the wide position, intermediate focal length and tele position of the Embodiment 11 are visualized in FIG. 50, FIG. 51 and FIG. 52 respectively.

Figure 53:
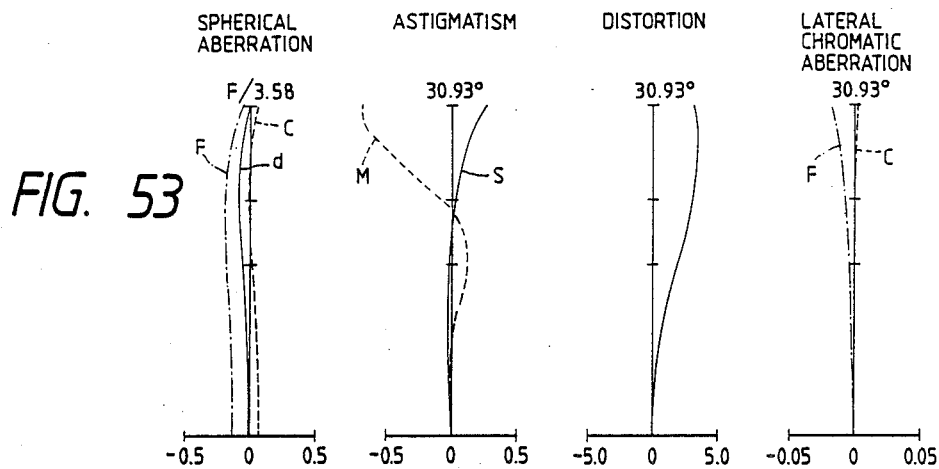
FIG. 53 through FIG. 55 show curves illustrating aberration characteristics of the Embodiment 12.
Figure 54:
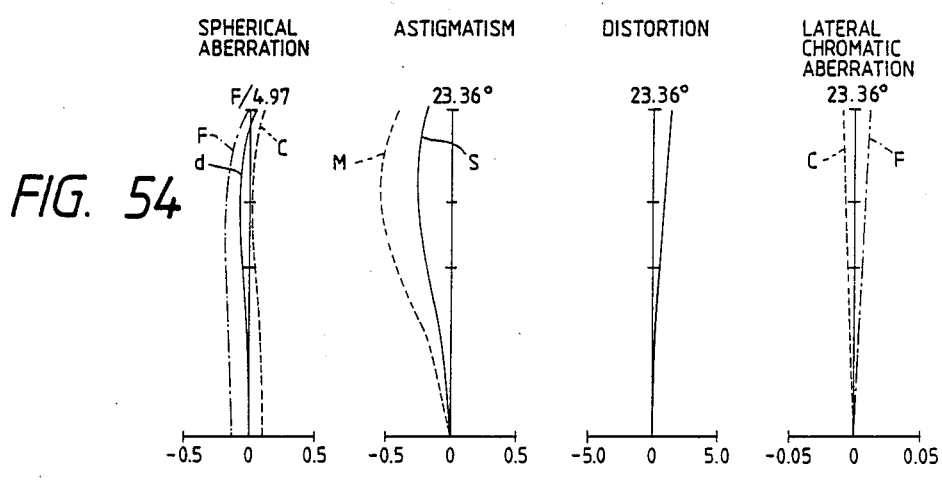
Figure 55:
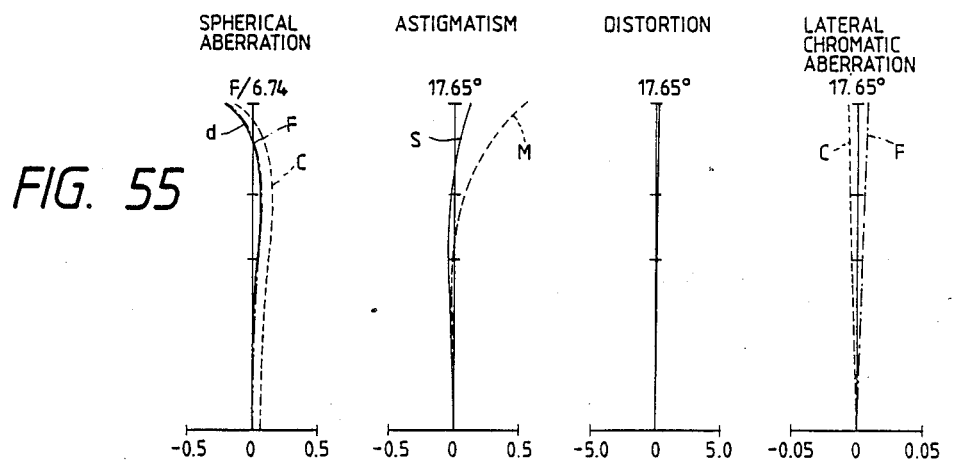

The Embodiment 12 adopts an aspherical surface as the ninth surface ($r_9$). Aberration characteristics at the wide position, intermediate focal length and tele position of the Embodiment 12 are illustrated in FIG. 53, FIG. 54 and FIG. 55 respectively.

Figure 56:
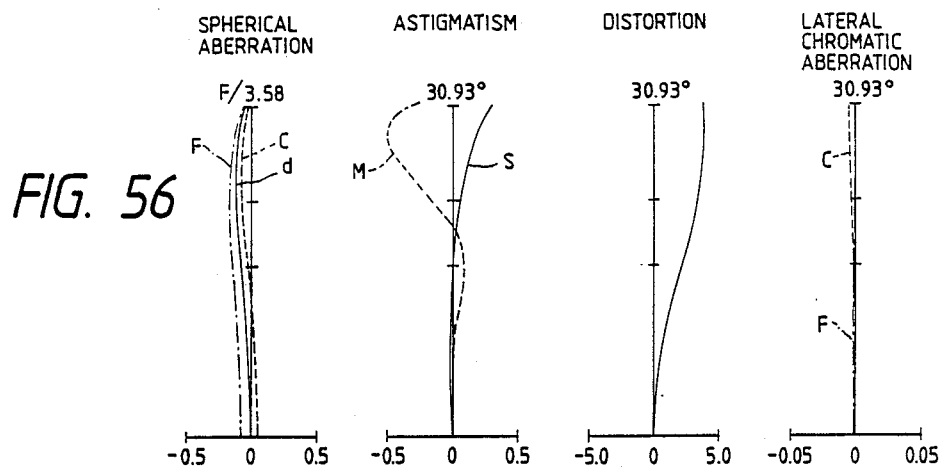
FIG. 56 through FIG. 58 show curves illustrating aberration characteristics of the Embodiment 13.
Figure 57:
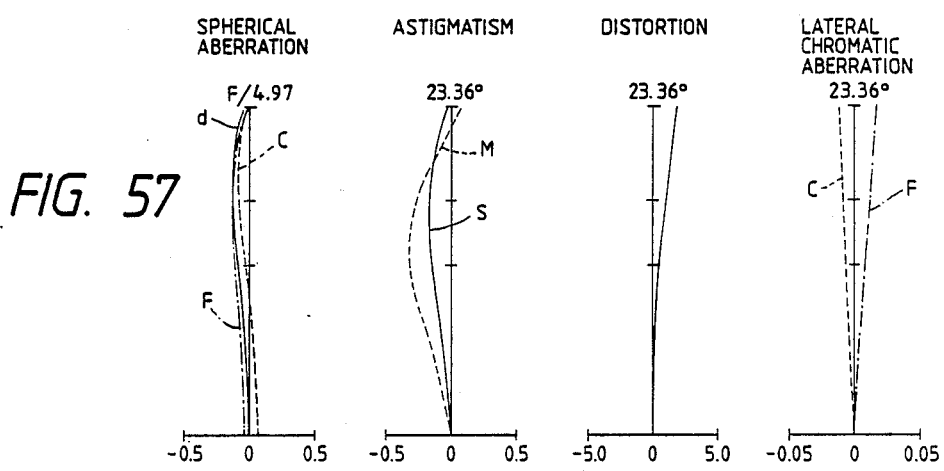
Figure 58:
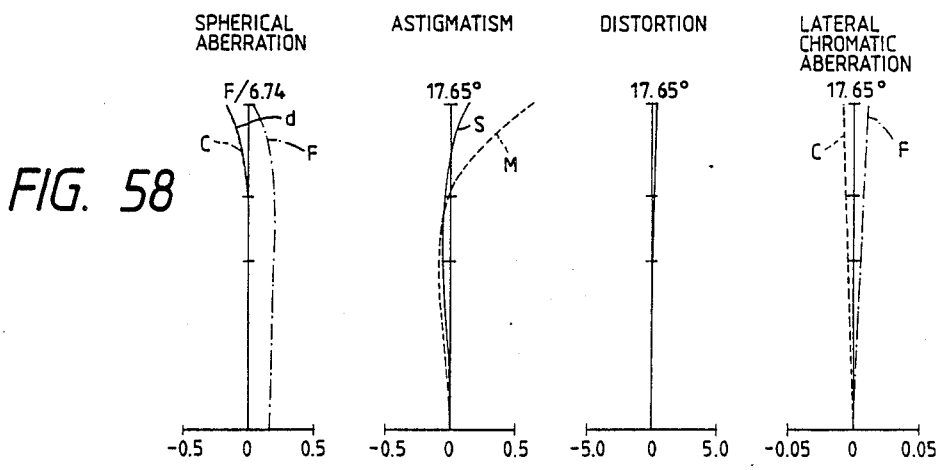

The Embodiment 13 uses an aspherical surface as the tenth surface ($r_{10}$). Aberration characteristics at the wide position, intermediate focal length and the tele position of the Embodiment 13 are shown in FIG. 56, FIG. 57 and FIG. 58 respectively.

Figure 59:
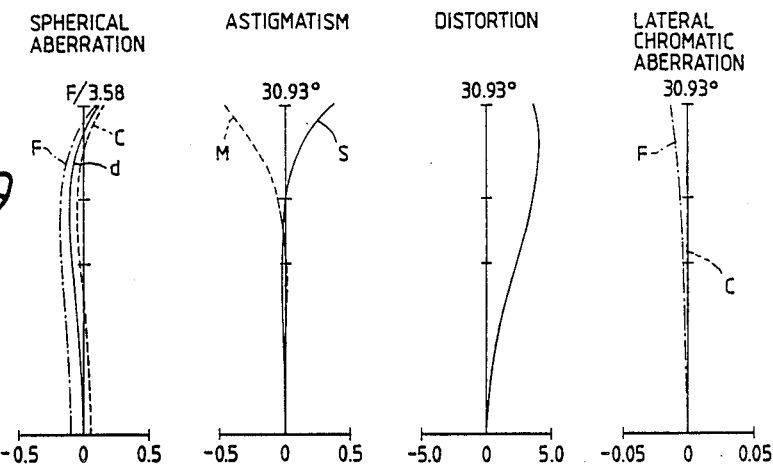
FIG. 59 through FIG. 61 show curves illustrating aberration characteristics of the Embodiment 14.
Figure 60:
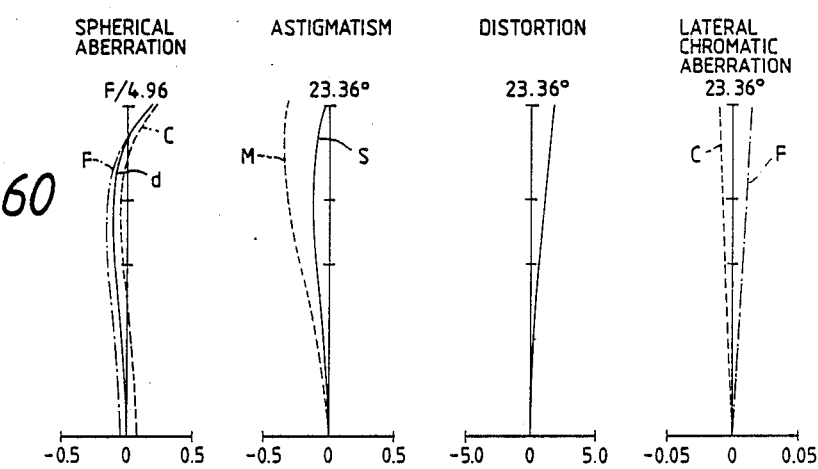
Figure 61:
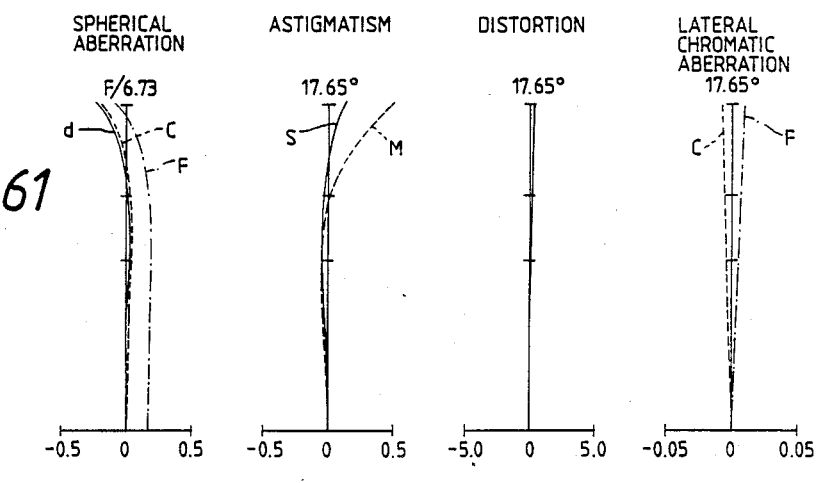

The Embodiment 14 uses an aspherical surface as the eighth lens surface ($r_8$). Aberration characteristics at the wide position, intermediate focal length and tele position of the Embodiment 14 are illustrated in FIG. 59, FIG. 60 and FIG. 61 respectively.

Figure 62:
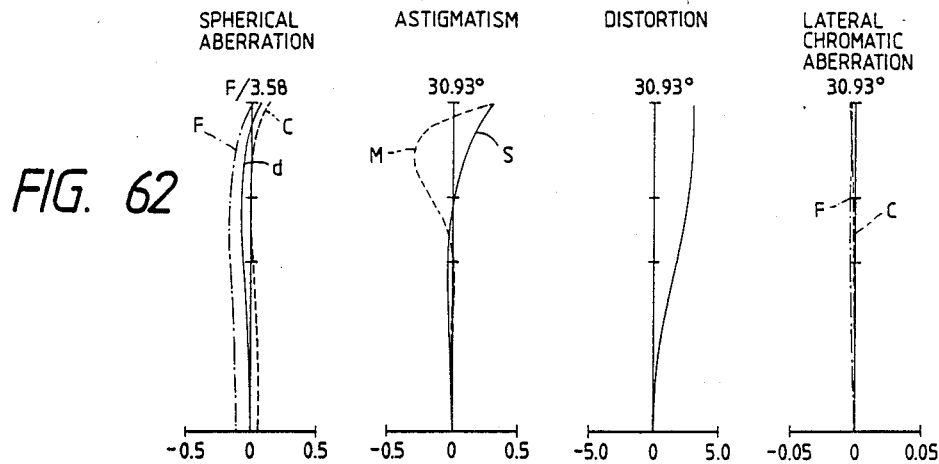
FIG. 62 through FIG. 64 show curves illustrating aberration characteristics of the Embodiment 15.
Figure 63:
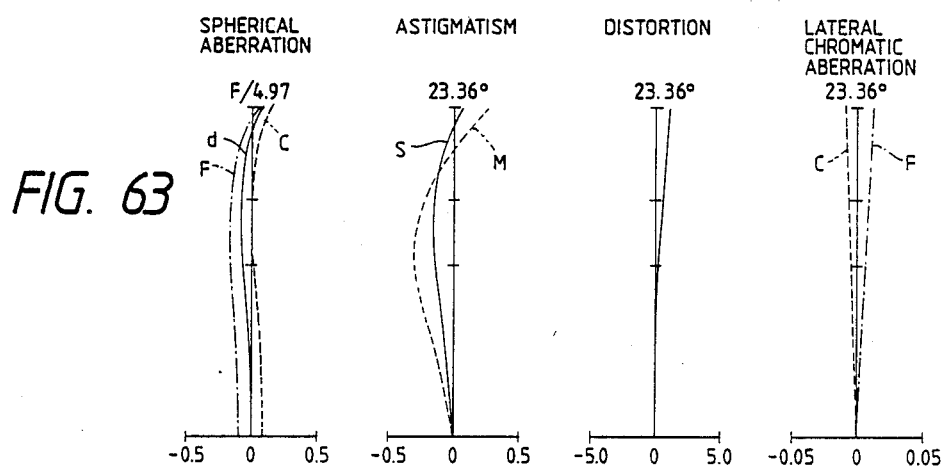
Figure 64:
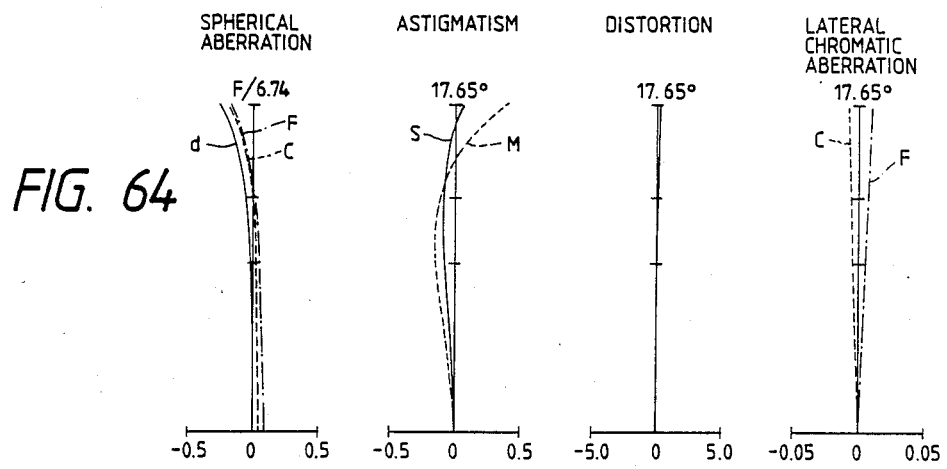

The Embodiment 15 adopts an aspherical surface as the tenth lens surface ($r_{10}$). Aberration characteristics at the wide position, intermediate focal length and tele position of the Embodiment 15 are shown in FIG. 62, FIG. 63 and FIG. 64 respectively.

Figure 65:
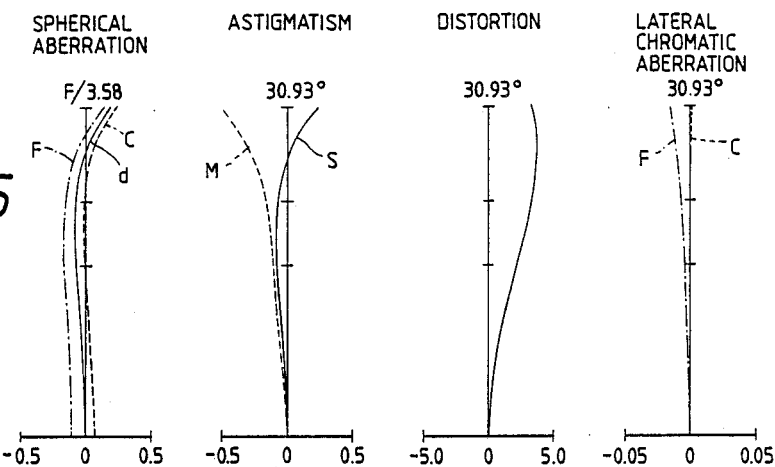
FIG. 65 through FIG. 67 show curves illustrating aberration characteristics of the Embodiment 16.
Figure 66:
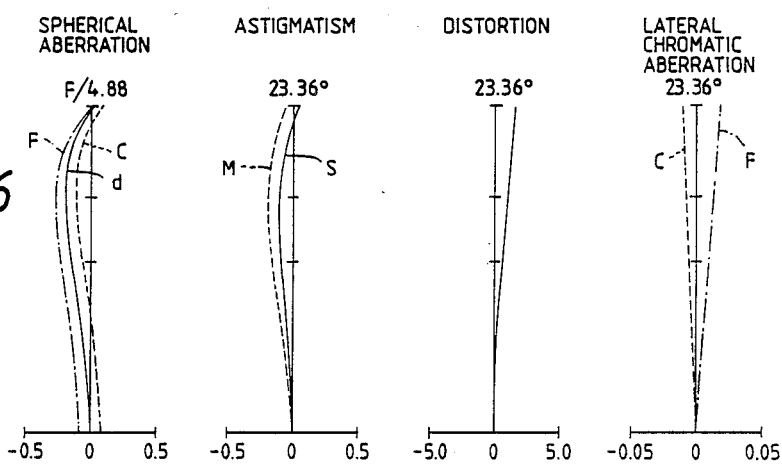
Figure 67:
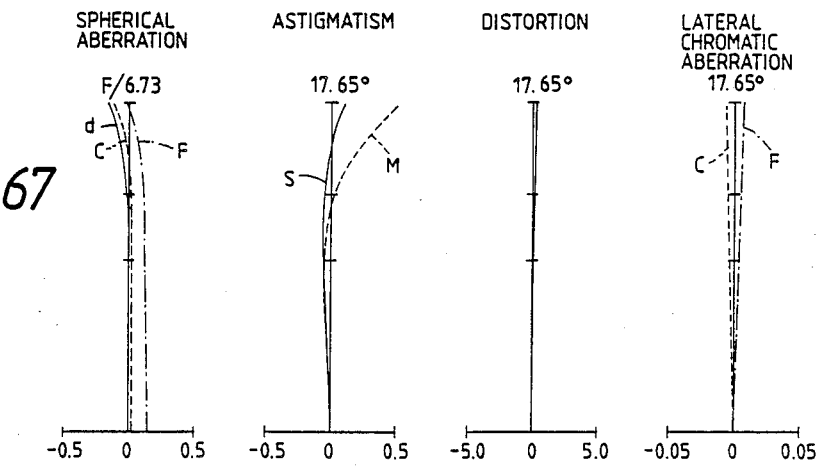

The Embodiment 16 uses an aspherical surface as the eighth lens surface ($r_8$). Aberration characteristics at the wide position, intermediate focal length and tele position of the Embodiment 16 are visualized in FIG. 65, FIG. 66 and FIG. 67 respectively.

Figure 68:
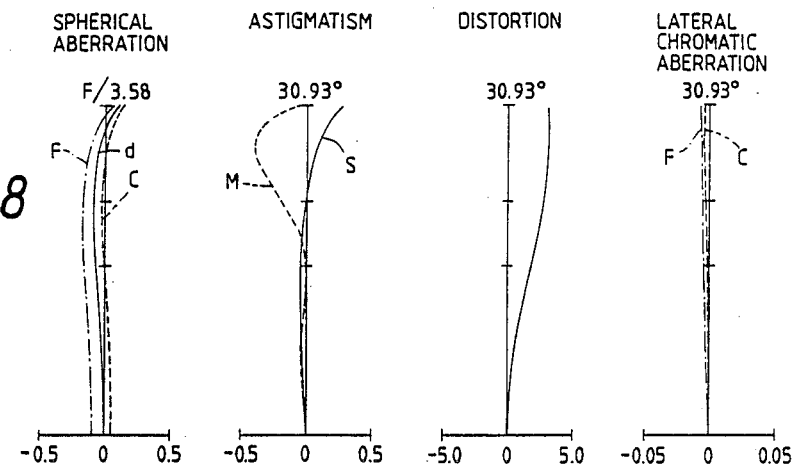
FIG. 68 through FIG. 70 show graphs illustrating aberration characteristics of the Embodiment 17.
Figure 69:
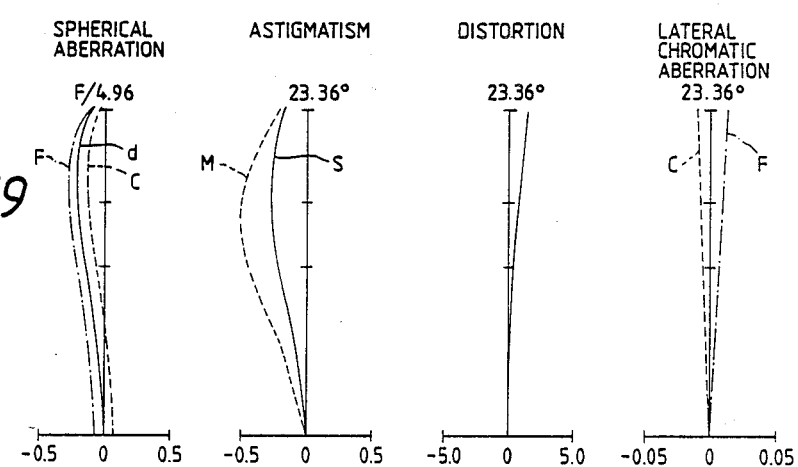
Figure 70:
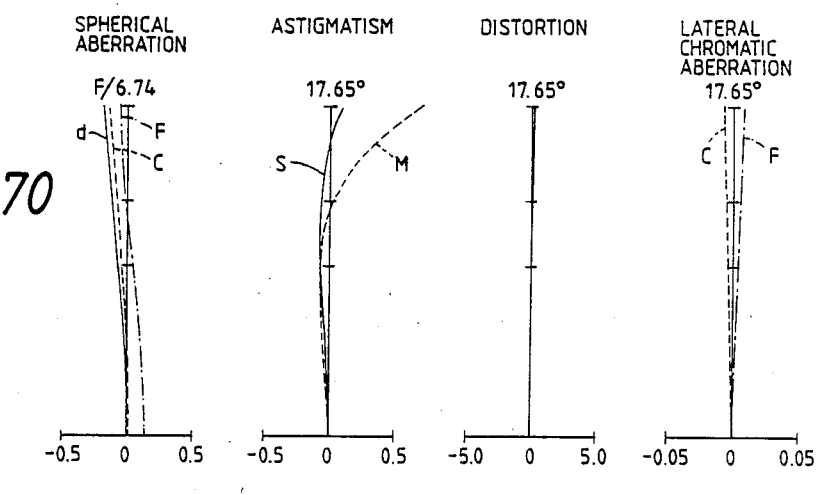

The Embodiment 17 uses an aspherical surface as the tenth lens surface ($r_{10}$). Aberration characteristics at the wide position, intermediate focal length and tele position of the Embodiment 17 are illustrated in FIG. 68, FIG. 69 and FIG. 70 respectively.

Figure 18:
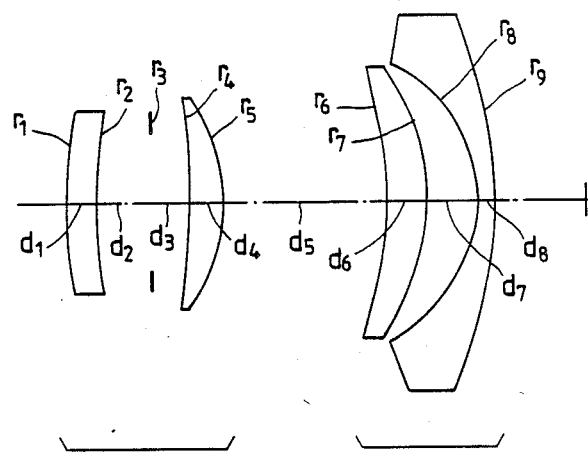
Figure 18:
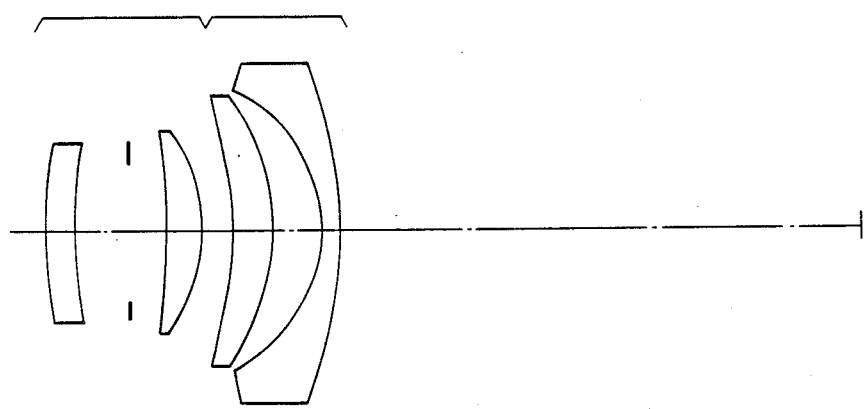
Figure 19:
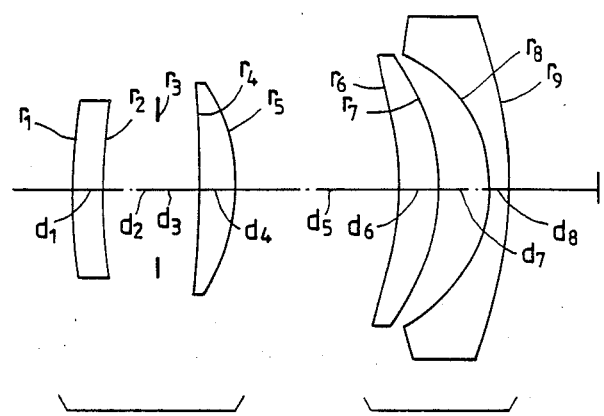
Figure 19:
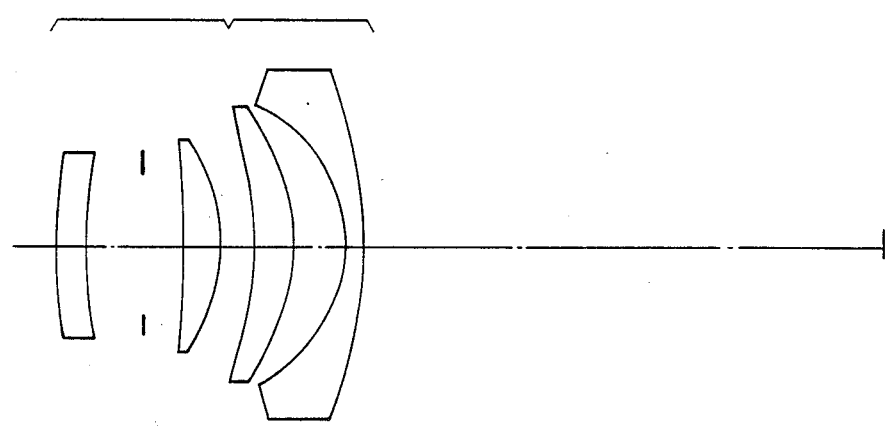

The Embodiments 18 and 19 have the compositions shown in FIG. 18 and FIG. 19 respectively.

In each of these two embodiments, the first lens group comprises two lens components designed as graded refractive index lens components. Further, the sixth lens surface ($r_6$) located on the extreme object side in the second lens group is designed as an aspherical surface.

Figure 71:
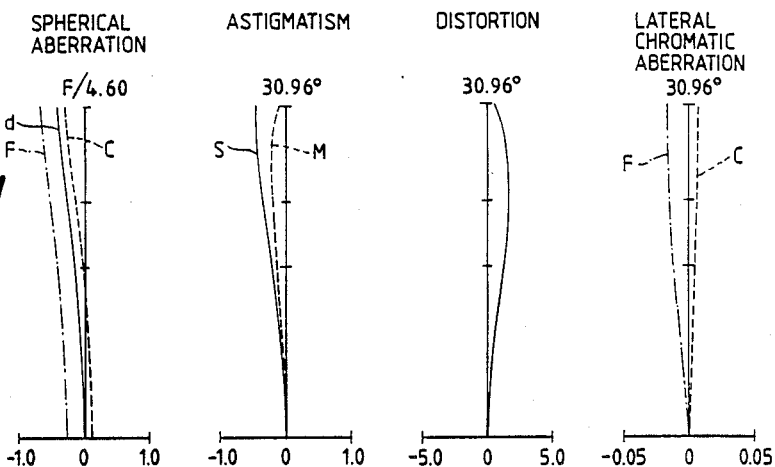
FIG. 71 through FIG. 73 show graphs illustrating aberration characteristics of the Embodiment 18.
Figure 72:
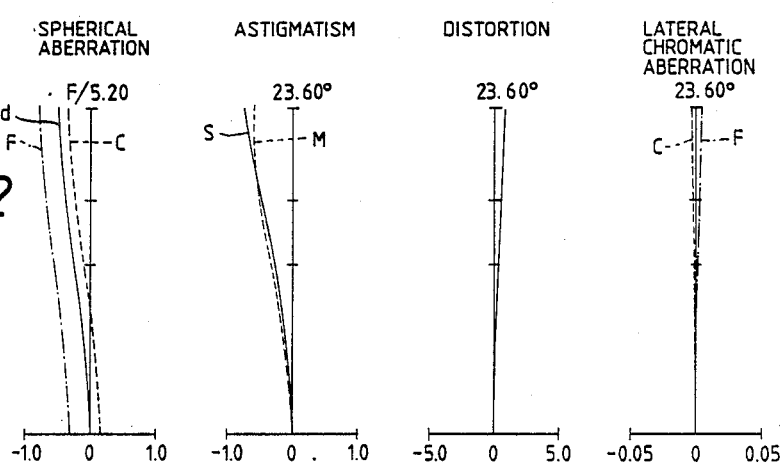
Figure 73:
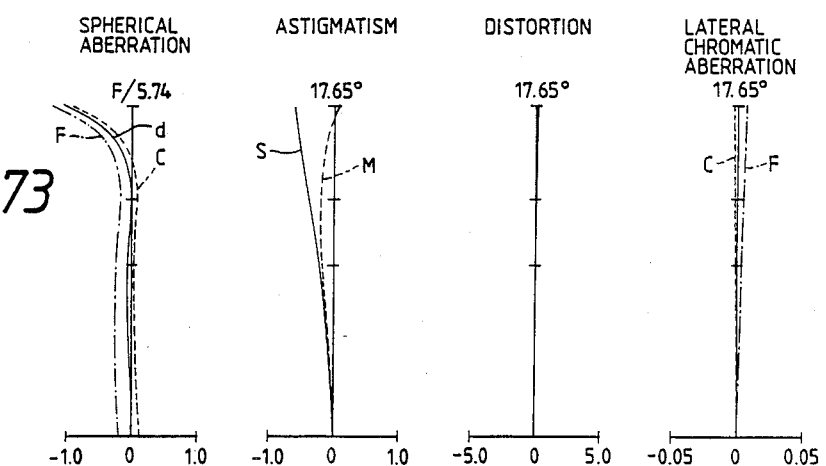

Aberration characteristics at the wide position, intermediate focal length and tele position of the Embodiment 18 are illustrated in FIG. 71, FIG. 72 and FIG. 73 respectively.

Figure 74:
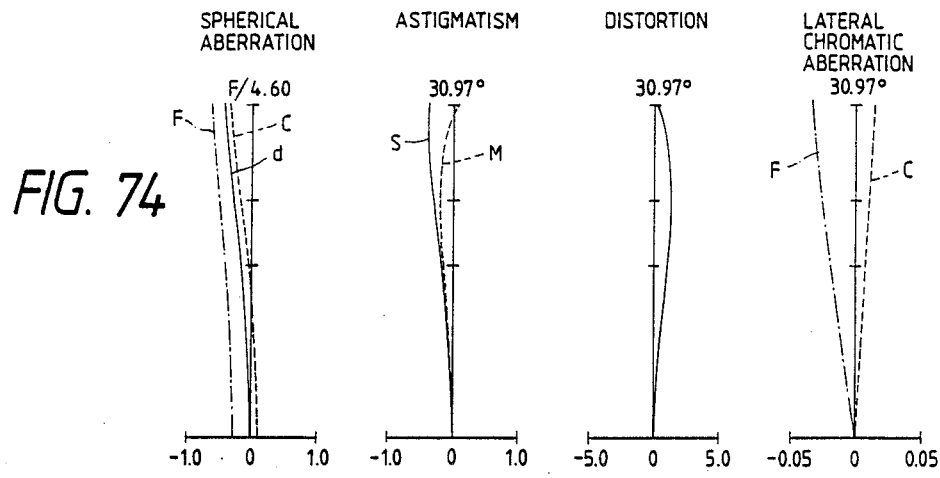
FIG. 74 through FIG. 76 show graphs illustrating aberration characteristics of the Embodiment 19.
Figure 75:
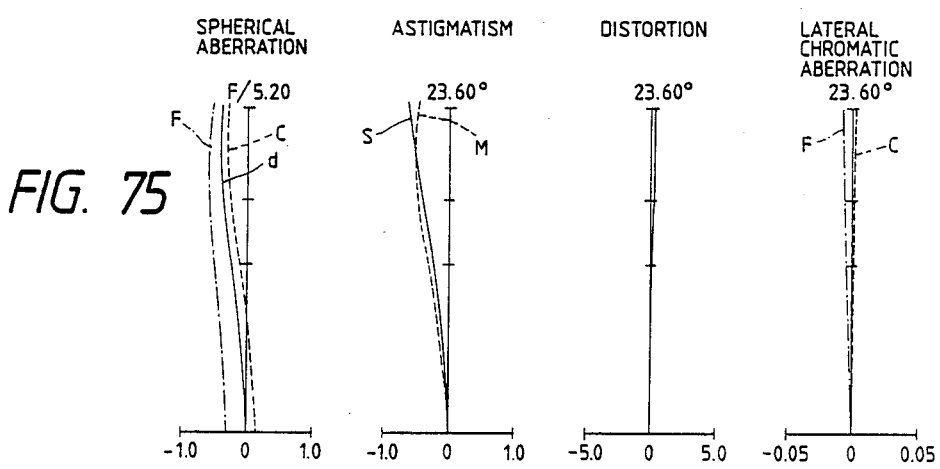
Figure 76:
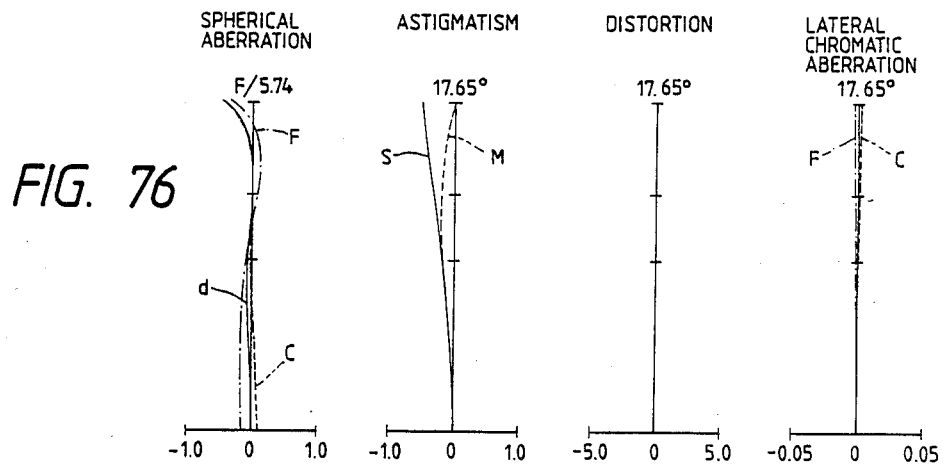

Aberration characteristics at the wide position, intermediate focal length and tele position of the Embodiment 19 are shown in FIG. 74, FIG. 75 and FIG. 76 respectively.

FIG. 20 through FIG. 49 show the aberration characteristics of the Embodiments 1 through 10 at a magnification level of 1/75, whereas FIG. 50 through FIG. 76 show the aberration characteristics of the Embodiments 11 through 19 focused on an object located at infinite distance.

Further, the values of the Embodiments related to the conditions are as listed below:

|  | $n_1(a)$ | $n_1(b)$ | $f_{1p}/f_W$ | $f_{Rp}/f_{Rn}$ |
|---|---|---|---|---|
| Embodiment 1 | $0.25416 \times 10^{-2}$ |  | 2.001 | −3.498 |
| Embodiment 2 | $0.70966 \times 10^{-3}$ | $-0.11465 \times 10^{-2}$ | 1.665 | −2.804 |
| Embodiment 3 | $0.18825 \times 10^{-2}$ | $-0.17722 \times 10^{-2}$ | 1.519 | −3.113 |
| Embodiment 4 | $0.18825 \times 10^{-2}$ | $-0.17722 \times 10^{-2}$ | 1.572 | −3.773 |
| Embodiment 5 | $0.19263 \times 10^{-2}$ | $-0.18323 \times 10^{-2}$ | 1.498 | −3.159 |
| Embodiment 6 | $0.19075 \times 10^{-2}$ | $-0.18246 \times 10^{-2}$ | 1.541 | −3.000 |
| Embodiment 7 | $0.23389 \times 10^{-2}$ | $-0.14296 \times 10^{-2}$ | 1.191 | −3.231 |
| Embodiment 8 | $0.19556 \times 10^{-2}$ | $-0.18737 \times 10^{-2}$ | 1.498 | −3.107 |
| Embodiment 9 | $0.19394 \times 10^{-2}$ | $-0.17789 \times 10^{-2}$ | 1.422 | −3.567 |
| Embodiment 10 | $0.27036 \times 10^{-2}$ | $-0.21705 \times 10^{-2}$ | 1.126 | −3.231 |

|  | $f_{Rp}/f_W$ | $(D_W,D_T)/Z$ | $f_{FP}/f_W$ | $HH/f_W$ |
|---|---|---|---|---|
| Embodiment 1 | 1.736 | 5.110 | 0.967 | 0.715 |
| Embodiment 2 | 1.351 | 6.022 | 0.802 | 0.650 |
| Embodiment 3 | 1.768 | 5.395 | 0.949 | 0.611 |
| Embodiment 4 | 1.844 | 5.884 | 0.946 | 0.610 |
| Embodiment 5 | 1.753 | 5.780 | 0.945 | 0.612 |
| Embodiment 6 | 1.632 | 5.853 | 0.940 | 0.612 |
| Embodiment 7 | 1.658 | 5.598 | 0.748 | 0.617 |
| Embodiment 8 | 1.697 | 5.257 | 0.949 | 0.612 |
| Embodiment 9 | 2.080 | 5.641 | 0.763 | 0.617 |
| Embodiment 10 | 1.769 | 4.413 | 0.746 | 0.614 |

|  | $n_1(b)$ | $f_{1p}/f_w$ | $f_{Rp}/f_{Rn}$ | $f_{Rp}/f_w$ | $(D_W - D_T)/Z$ | $f_{Fp}/f_w$ | $HH/f_w$ |
|---|---|---|---|---|---|---|---|
| Embodiment 11 | $-0.15478 \times 10^{-2}$ | 1.1865 | −3.1173 | 1.8593 | 6.4066 | 0.6557 | 0.5900 |
| Embodiment 12 | $-0.16238 \times 10^{-2}$ | 1.3094 | −2.7671 | 1.7252 | 7.2902 | 0.6920 | 0.5740 |
| Embodiment 13 | $-0.16229 \times 10^{-2}$ | 1.3021 | −2.6857 | 1.6082 | 7.1564 | 0.7052 | 0.5898 |
| Embodiment 14 | $-0.15322 \times 10^{-2}$ | 1.2420 | −2.9768 | 1.8370 | 6.8228 | 0.6766 | 0.5864 |
| Embodiment 15 | $-0.16229 \times 10^{-2}$ | 1.3164 | −2.7160 | 1.6425 | 7.1835 | 0.6854 | 0.5877 |
| Embodiment 16 | $-0.15281 \times 10^{-2}$ | 1.2460 | −3.0328 | 1.9213 | 6.8670 | 0.6685 | 0.5731 |
| Embodiment 17 | $-0.16413 \times 10^{-2}$ | 1.3178 | −2.7043 | 1.6610 | 7.4266 | 0.6787 | 0.5819 |
| Embodiment 18 | $-0.31362 \times 10^{-3}$ | 6.0083 | −5.2613 | 3.8372 | 5.9652 | 0.8090 | 0.5568 |
| Embodiment 19 | $-0.39733 \times 10^{-3}$ | 10.2359 | −5.3587 | 3.8485 | 5.7831 | 0.7738 | 0.5628 |

Out of the embodiments described above, the Embodiments 1, 3, 12, 13, 14, 15, 17, 18 and 19 adopt a concave lens surface having a large radius of curvature as the object side surface of the lens component arranged on the extreme image side in the first lens group. Accordingly, this lens surface performs a roll to correct negative spherical aberration. As is understood from the foregoing descriptions, the zoom lens system according to the present invention designed for a zooming ratio of 2 has four or five lens components, a back focal length of 8.2 mm, a telephoto ratio of 1.25 or lower, favorably corrected aberrations and little variations of aberrations during the zooming operation.

We claim:

1. A zoom lens system comprising, in the order from the object side, a first lens group having positive refractive power and a second lens group having negative refractive power, and so adapted as to perform variation of focal length by varying an airspace reserved between the two lens groups, said second lens group comprising at least one positive lens component designed as a graded refractive index lens component.

2. A zoom lens system according to claim 1 wherein the graded refractive index lens component arranged in said second lens group has the refractive index distribution expressed by the following formula (A) and satisfies the following condition (1):

$$n(r) = n_0 + n_1 r^2 + n_2 r^4 + \quad (A)$$

$$n_1(a) > 0 \quad (1)$$

wherein the reference symbol r represents radial distance as measured from the lens center, the reference symbol n(r) designates refractive index of a lens portion located at a radial distance of r, the reference symbol $n_0$ denotes refractive index at the lens center, and the reference symbols $n_1$, $n_2$, ... represent coefficients of refractive index distribution.

3. A zoom lens system according to claim 2 satisfying the following conditions (3) through (6):

$$0.5 < f_{1p}/f_w < 15 \quad (3)$$

$$-10 < f_{Rp}/f_{Rn} < -1 \quad (4)$$

$$0.5 < f_{Rp}/f_W \quad (5)$$

$$(D_W - D_T)/Z < 8.2 \quad (6)$$

wherein the reference symbol $f_{1p}$ represents focal length of the positive lens component arranged on the extreme object side in the first lens group, the reference symbol $f_{Rp}$ designates focal length of the positive lens component arranged in the second lens group, the reference symbol $f_{Rn}$ denotes focal length of the negative lens component arranged in the second lens group, the reference symbol $f_W$ represents focal length of the zoom lens system as a whole at the wide position thereof, the reference symbols $D_W$ and $D_T$ designate the airspace reserved between the first and second lens groups at the wide position and the tele position respectively, and the reference symbol z denotes zooming ratio.

4. A zoom lens system according to claim 3 satisfying the following additional conditions (7) and (8):

$$0.4 < f_{Fp}/f_W < 1.2 \quad (7)$$

$$HH/f_W < 0.8 \quad (8)$$

wherein the reference symbol $f_{Fp}$ represents focal length of the positive lens component arranged on the extreme image side in the first lens group and the reference symbol HH designates distance between the principal points of the zoom lens system as a whole at the wide position thereof.

5. A zoom lens system according to claim 2 wherein said first lens group comprises at least one graded refractive index lens component and said second lens group comprises at least one aspherical surface, refractive index distribution of said graded refractive index lens component being expressed by the following formula (A) and said zoom lens system being so designed as to satisfy the following condition (2)

$$n(r) = n_0 + n_1 r^2 + n_2 r^4 + \ldots$$

$$(z) n_1(b) < 0$$

wherein the reference symbol r represents radial distance as measured from the lens center, the reference symbol n(r) designates refractive index at the radial distance r, the reference symbol $n_0$ denotes refractive index at the lens center, and the reference symbols $n_1$, $n_2$, ... represent the coefficients of refractive index distribution.

6. A zoom lens system according to claim 5 satisfying the following conditions (3) through (6):

$$0.5 < f_{1p}/f_W < 15 \quad (3)$$

$$-10 < f_{Rp}/f_{Rn} < -1 \quad (4)$$

$$0.5 < f_{Rp}/f_W \quad (5)$$

$$(D_W - D_T)/Z < 8.2 \quad (6)$$

wherein the reference symbol $f_{1p}$ represents focal length of the positive lens component arranged on the extreme object side in the first lens group, the reference symbol $f_{Rp}$ designates focal length of the positive lens component arranged in the second lens group, the reference symbol $f_{Rn}$ denotes focal length of the negative lens component arranged in the second lens group, the reference symbol $f_W$ represents focal length of the zoom lens system as a whole at the wide position thereof, the reference symbols $D_W$ and $D_T$ designate the airspace reserved between the first and second lens groups at the wide position and the tele position respectively, and the reference symbol z denotes zooming ratio.

7. A zoom lens system according to claim 6 satisfying the following additional contitions (7) and (8):

$$0.4 < f_{FP}/f_W < 1.2 \quad (7)$$

$$HH/f_W < 0.8 \quad (8)$$

wherein the reference symbol $f_{Fp}$ represents focal length of the positive lens component arranged on the extreme image side in the first lens group and the reference symbol HH designates distance between the principal points of the zoom lens system as a whole at the wide position therof.

8. A zoom lens system according to claim 1 wherein the lens component arranged on the extreme image side in the first lens group is designed as a graded refractive index lens component having the refractive index distribution expressed by the following formula (A) and satisfying the following condition:

$$n(r) = n_0 + n_1 r^2 + n_2 r^4 + \ldots \quad (A)$$

$$n_1 < 0$$

wherein the reference symbol r represents radial distance as measured from the lens center, the reference symbol n(r) designates refractive index of a lens portion located at a radial distance of r, the reference symbol $n_0$ denotes refractive index at the lens center, and the reference symbols $n_1$, $n_2$, ... represent coefficients of refractive index distribution.

9. A zoom lens system according to claim 1 so adapted as to vary the airspace reserved between the positive lens component and the negative lens component in the second lens group during variation of focal length.

* * * * *